United States Patent
Sperry et al.

(10) Patent No.: US 7,641,459 B2
(45) Date of Patent: Jan. 5, 2010

(54) FOAM CUSHION MOLDING SYSTEM AND METHOD

(75) Inventors: Charles R. Sperry, Leeds, MA (US); Vincent A. Piucci, Jr., Spencer, MA (US); Michael J. Schamel, Wilmont, NH (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 438 days.

(21) Appl. No.: 11/414,972

(22) Filed: May 1, 2006

(65) Prior Publication Data
US 2007/0252297 A1 Nov. 1, 2007

(51) Int. Cl.
*B29C 44/36* (2006.01)

(52) U.S. Cl. .......... 425/4 R; 425/817 R; 425/127; 425/437; 425/DIG. 60; 425/112

(58) Field of Classification Search .......... 425/4 R, 425/817 R, 127, 117, 437, DIG. 60, 110, 425/112; 264/46.8
See application file for complete search history.

(56) References Cited

U.S. PATENT DOCUMENTS

| | | | | |
|---|---|---|---|---|
| 3,159,875 A | * | 12/1964 | Stutz et al. | 425/217 |
| 3,484,510 A | * | 12/1969 | Corazza | 264/51 |
| 3,548,451 A | | 12/1970 | Carmi et al. | |
| 3,712,771 A | * | 1/1973 | White et al. | 425/126.1 |
| 3,826,381 A | * | 7/1974 | Kulig et al. | 198/428 |
| 4,045,153 A | | 8/1977 | Maurino et al. | |
| 4,208,368 A | * | 6/1980 | Egli | 264/45.5 |
| 4,493,627 A | * | 1/1985 | O'Malley et al. | 425/89 |
| 4,571,320 A | | 2/1986 | Walker | |
| 4,637,789 A | * | 1/1987 | Netznik | 425/89 |
| 4,661,391 A | * | 4/1987 | Schroder et al. | 428/159 |
| 4,755,117 A | * | 7/1988 | Onnenberg et al. | 425/4 R |
| 4,781,569 A | * | 11/1988 | Kinugasa et al. | 425/504 |
| 4,783,292 A | | 11/1988 | Rogers | |
| 4,793,793 A | * | 12/1988 | Swenson et al. | 425/503 |
| 4,806,088 A | * | 2/1989 | Busch et al. | 425/127 |
| 4,875,843 A | * | 10/1989 | Onnenberg et al. | 425/4 R |
| 4,921,561 A | * | 5/1990 | Kinugasa et al. | 156/219 |
| 4,971,541 A | * | 11/1990 | Onnenberg et al. | 425/111 |

(Continued)

FOREIGN PATENT DOCUMENTS

DE 1 604 468 10/1970

(Continued)

*Primary Examiner*—Steven P Griffin
*Assistant Examiner*—Seyed Masoud Malekzadeh
(74) *Attorney, Agent, or Firm*—Alston & Bird LLP

(57) ABSTRACT

A molding system for foam-in-bag cushions comprises a mold defining a mold cavity, an air plenum separate from the mold cavity, a plurality of air passages that connect the mold cavity to the air plenum, and at least one port connected to the air plenum. The mold cavity has an open side and the mold includes a door that is movable between a closed position closing the open side of the mold cavity and an open position allowing a cushion to enter and exit through the open side. The system further comprises a pneumatic vacuum/blowout system connected with the at least one port. The vacuum/blowout system comprises a vacuum source, an air tank containing pressurized air, and a vacuum/blowout valve structured and arranged to alternately couple the at least one port either to the vacuum source or to the air tank.

22 Claims, 19 Drawing Sheets

U.S. PATENT DOCUMENTS

| | | | |
|---|---|---|---|
| 5,027,583 A | | 7/1991 | Chelak |
| 5,034,178 A | * | 7/1991 | Kinugasa et al. ............ 264/510 |
| 5,252,617 A | | 10/1993 | Werner et al. |
| 5,376,219 A | | 12/1994 | Sperry et al. |
| 5,451,144 A | * | 9/1995 | French ........................ 417/131 |
| 5,462,421 A | * | 10/1995 | Stein et al. .................. 425/4 R |
| 5,720,992 A | * | 2/1998 | Brown ........................ 425/388 |
| 5,776,510 A | * | 7/1998 | Reichental et al. .......... 425/112 |
| 5,935,511 A | | 8/1999 | Brown |
| 5,948,341 A | | 9/1999 | Diamond et al. |
| 5,965,169 A | * | 10/1999 | Hirata et al. ................ 425/4 R |
| 6,003,288 A | | 12/1999 | Sperry et al. |
| 6,036,899 A | * | 3/2000 | Iwai et al. ..................... 264/51 |
| 6,386,850 B1 | * | 5/2002 | Salerno et al. ............... 425/112 |
| 7,261,549 B2 | * | 8/2007 | Wennberg ................... 425/444 |
| 2003/0039800 A1 | * | 2/2003 | Nohara et al. ................... 428/71 |
| 2003/0077344 A1 | * | 4/2003 | Kato et al. ..................... 425/112 |
| 2004/0053032 A1 | * | 3/2004 | Weingartner ............. 428/304.4 |
| 2004/0091560 A1 | * | 5/2004 | Takei ......................... 425/123 |
| 2004/0094858 A1 | * | 5/2004 | Kim ............................. 264/51 |
| 2005/0161851 A1 | * | 7/2005 | Tachauer et al. ............ 264/45.9 |
| 2005/0253293 A1 | * | 11/2005 | Cathcart et al. ............... 264/41 |
| 2007/0252298 A1 | * | 11/2007 | Sperry et al. ............... 264/46.5 |
| 2008/0148687 A1 | * | 6/2008 | Soudan ...................... 53/284.7 |

FOREIGN PATENT DOCUMENTS

| | | |
|---|---|---|
| DE | 32 34 284 | 5/1984 |
| EP | 1 156 247 A2 * | 5/2001 |
| GB | 2 010 731 | 7/1978 |

* cited by examiner

FOAM CUSHION MOLDING SYSTEM AND METHOD

BACKGROUND OF THE INVENTION

The present invention relates generally to foam-in-place or foam-in-bag cushions used as protective cushioning materials for product packaging. The invention relates more particularly to a system and method for molding such foam cushions into desired shapes.

Foam-in-place packaging is a highly useful technique for on-demand protection of packaged objects. In its most basic form, foam-in-place packaging comprises injecting a foam-forming composition from a dispenser into a container that holds an object to be cushioned. Typically, the object is wrapped in plastic to keep it from direct contact with the rising (expanding) foam. As the foam rises, it expands into the void space between the object and its container (e.g., a corrugated board box), thus forming a custom cushion for the object.

A common foam-forming composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged object.

In other types of foam-in-place packaging, an automated apparatus produces foam-in-bag cushions by making bags from flexible plastic film and dispensing a foam-forming composition into the bags as they are being formed. As the composition expands into a foam within a bag, the bag is sealed shut and typically is then dropped into a container holding the object to be cushioned. The rising foam again tends to expand into the available space, but does so inside the bag. Because the bags are formed of flexible plastic, they form individual custom foam cushions around the packaged objects. Exemplary types of such packaging apparatus are assigned to the assignee of the present application, and are illustrated, for example, in U.S. Pat. Nos. 4,800,708, 4,854,109, 5,027,583, 5,376,219, and 6,003,288, the entire disclosures of each of which are incorporated herein by reference.

In some applications, it is desirable for the foam cushions to have a certain predetermined shape. For example, it may be desirable for the cushions to be made in advance of a packaged object being placed into a carton. In such instances, it is desirable for the cushions to fit properly about the object and/or against the inner walls of the carton, and therefore it is necessary to mold the cushions to have the correct shape. Accordingly, a molding system and method are needed.

Current systems for molding foam cushions generally comprise a mold defining a mold cavity that is a negative impression of the desired shape of the cushions to be produced. The mold has a door that is closed after the expanding foam cushion is placed inside the mold cavity. The cushion is allowed to substantially fully expand within the mold cavity, and the door is then opened and the molded foam cushion is removed. In some molding systems, some or all of these actions are performed manually by a worker. In other cases, fully automatic molding systems have been developed employing a foam-in-bag cushion-making apparatus and a plurality of molds that are sequentially supplied with expanding cushions from the apparatus, wherein the cushions are automatically placed into the molds and then are automatically removed from the molds using mechanical devices such as rods that push the molded cushions out of the molds. The mechanical devices can cause distortion of the molded cushions.

It is desirable to automate the molding process to as great an extent as possible and to improve upon existing automated systems.

Additionally, in current cushion-molding processes, it is often difficult to ensure that the cushion settles fully into the mold cavity when placed therein. If the cushion does not properly settle into the cavity, the expanding cushion may not completely fill out all regions of the cavity, and the resulting molded cushion may have defects in shape that can render the cushion unusable for its intended purpose.

Thus, it is desirable for an automated system and method to ensure proper settling of the expanding cushion into the mold cavity.

BRIEF SUMMARY OF THE INVENTION

The present invention seeks to address the above-noted needs. In accordance with one embodiment of the invention, a molding system for molding foam-in-bag cushions comprises a mold defining a mold cavity, an air plenum separate from the mold cavity, a plurality of air passages that connect the mold cavity to the air plenum, and at least one port connected to the air plenum. The mold cavity has an open side to permit a cushion to enter the mold cavity and subsequently to exit the mold cavity after expansion of the cushion, and the mold includes a door that is movable between a closed position closing the open side of the mold cavity and an open position allowing a cushion to enter and exit through the open side. The system further comprises a pneumatic vacuum/blowout system connected with the at least one port. The vacuum/blowout system comprises a vacuum source, an air tank containing pressurized air, and a vacuum/blowout valve structured and arranged to alternately couple the at least one port either to the vacuum source or to the air tank.

When the vacuum source is connected to the at least one port by the vacuum/blowout valve, air is evacuated from the mold cavity via the air passages and air plenum so as to suck a newly formed cushion into the mold cavity. The door is then closed and the cushion is allowed to expand to substantially fill the mold cavity. Next, the door is opened and the vacuum/blowout valve is operated to connect the air tank to the at least one port. Accordingly, pressurized air is supplied from the air tank to the mold cavity via the air plenum and air passages to expel the cushion from the mold cavity.

The system can include an air compressor coupled with the air tank for pressurizing the air tank. In one embodiment, the system includes a pneumatic cylinder connected with the door for opening and closing the door, the pneumatic cylinder being coupled with the air compressor via a controllable valve system.

The vacuum/blowout system in one embodiment of the invention comprises an air chamber connected to the at least one port and having a first passage connected to the air tank and a second passage connected to the vacuum source. The vacuum/blowout valve comprises a shuttle valve having a valve member that shuttles between a vacuum position closing the first passage and opening the second passage such that the at least one port is coupled to the vacuum source, and a blowout position opening the first passage and closing the second passage such that the at least one port is coupled to the air tank.

In one embodiment, the shuttle valve comprises a magnetic shuttle valve. The shuttle valve includes a magnet arranged for exerting a magnetic attraction force on the valve member urging the valve member toward the vacuum position, and the valve member is arranged such that air pressure within the air tank acts on the valve member to urge the valve member toward the blowout position. Accordingly, when sufficient pressure builds up in the air tank, the air pressure overcomes the magnetic attraction force to move the valve member to the blowout position.

In one embodiment, the valve member is movable in a shuttle guide between the vacuum and blowout positions, the magnet is affixed to the shuttle guide, and at least a portion of the valve member is a magnetically permeable material attracted by the magnet.

In accordance with another embodiment, the air tank includes a valve cap that comprises the magnetic shuttle valve and defines at least part of the air chamber.

The valve member of the shuttle valve can include a tubular portion, and the valve cap can define a guide passage connected to the second passage in the air chamber, the guide passage receiving the tubular portion of the valve member at least in the blowout position. In one embodiment, the tubular portion of the valve member has one or more apertures through a side wall of the tubular portion into an interior thereof. The valve member in the blowout position is disposed in the guide passage so as to substantially isolate the one or more apertures from the air chamber. The valve member in the vacuum position is withdrawn sufficiently from the guide passage to expose the one or more apertures to the air chamber so as to conduct air from the air chamber through the one or more apertures into the guide passage.

The molding system in accordance with a further embodiment of the invention includes a latch mechanism for latching the door in the closed position, the latch mechanism being movable between latched and unlatched positions. In one embodiment, the latch mechanism comprises a latch mounted on the door adjacent one edge thereof such that the latch is pivotable relative to the door, and a catch affixed to the mold for being engaged by the latch in the latched position of the latch mechanism. The latch mechanism further comprises a lever having one end connected to the latch and an opposite end connected to an actuator such as a pneumatic cylinder for opening and closing the door. The lever is moved by the actuator to pivot the latch to the unlatched position disengaged from the catch in order to open the door.

In one embodiment, the latch is pivotally connected to the lever and is biased by a spring to pivot in a first direction toward a latching position of the latch relative to the lever, and the catch is arranged such that as the door is moved to the closed position thereof, the catch urges the latch to pivot in a second direction, opposite to the first direction, out of the latching position until the latch clears the catch and then the spring urges the latch to pivot in the first direction back to the latching position to engage the catch and prevent the door from opening.

The latch mechanism can be configured such that the latch at all times is prevented from pivoting in the first direction past the latching position, and such that when the actuator begins to move the lever to open the door, the lever and latch pivot as a unit to disengage the latch from the catch before the door begins to open.

The molding system in accordance with another embodiment of the invention includes a frame supporting the mold and the pneumatic vacuum/blowout system. The system can also include a cushion-making apparatus supported on the frame and arranged to supply a cushion to the mold.

In one embodiment, the mold is releasably attached to the frame. Accordingly, molds of different configurations can be mounted to the frame for making cushions of different shapes and/or different sizes.

In accordance with a further embodiment of the invention, a method for molding foam-in-bag cushions comprises the steps of: (1) providing a mold defining a mold cavity having an open side to permit a cushion to enter the mold cavity and subsequently to exit the mold cavity after expansion of the cushion, the mold further comprising a door that is movable between a closed position closing the open side of the mold cavity and an open position allowing a cushion to enter and exit through the open side; (2) providing an air plenum separate from the mold cavity, a plurality of air passages that connect the mold cavity to the air plenum, and at least one port connected to the air plenum; (3) positioning the door in the open position and disposing a cushion adjacent the open side of the mold cavity; (4) exerting vacuum through the at least one port so as to create a sub-atmospheric pressure within the mold cavity to suction the cushion into the mold cavity; (5) moving the door to the closed position to enclose the cushion in the mold cavity until the cushion has expanded to substantially fill the mold cavity, and then opening the door; and (6) supplying pressurized air through the at least one port to expel the cushion out the open side of the mold cavity solely by air pressure.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
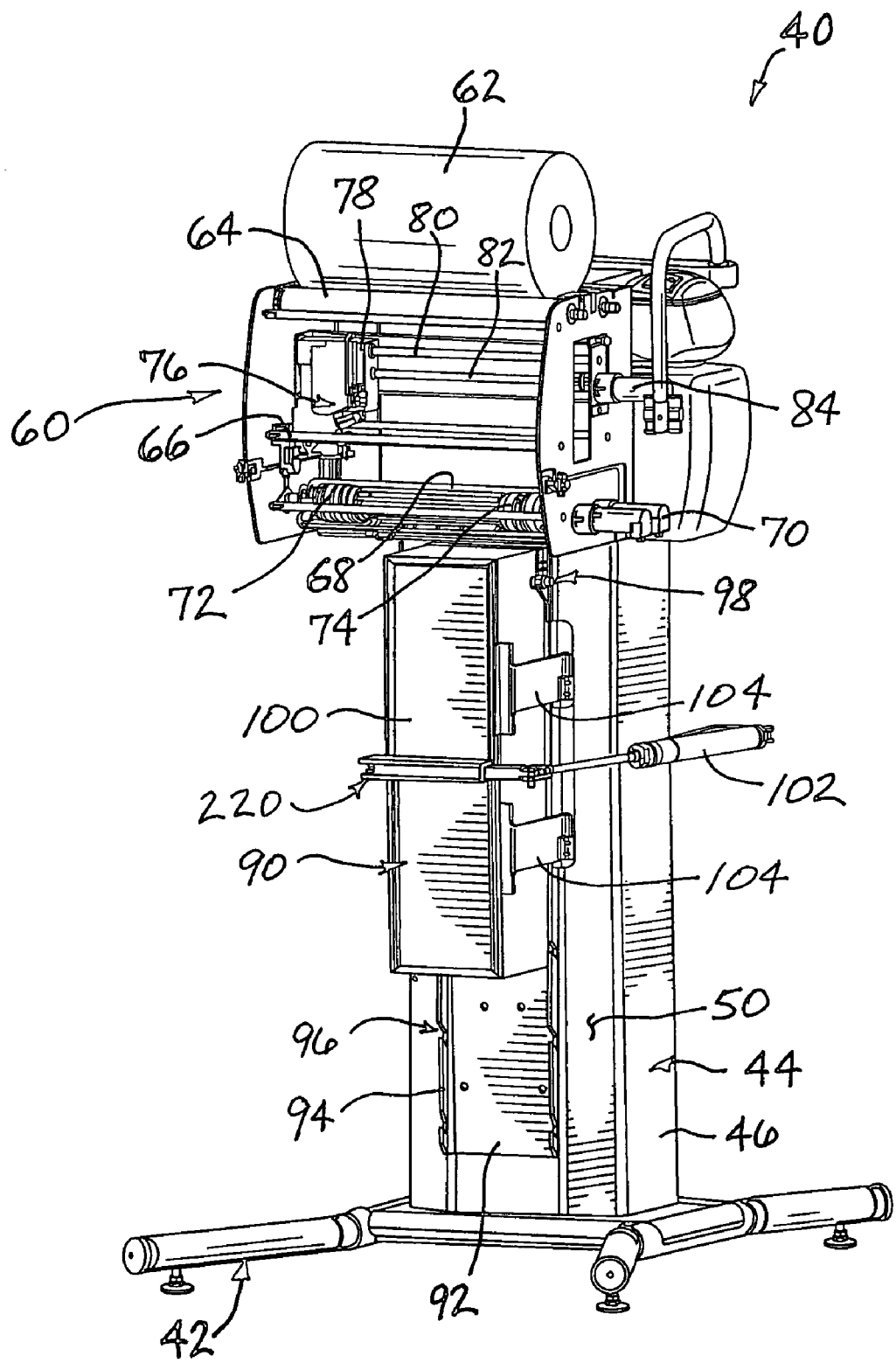
FIG. 1 is a perspective view, generally from a front side, of a molding system in accordance with one embodiment of the invention.
Figure 2:
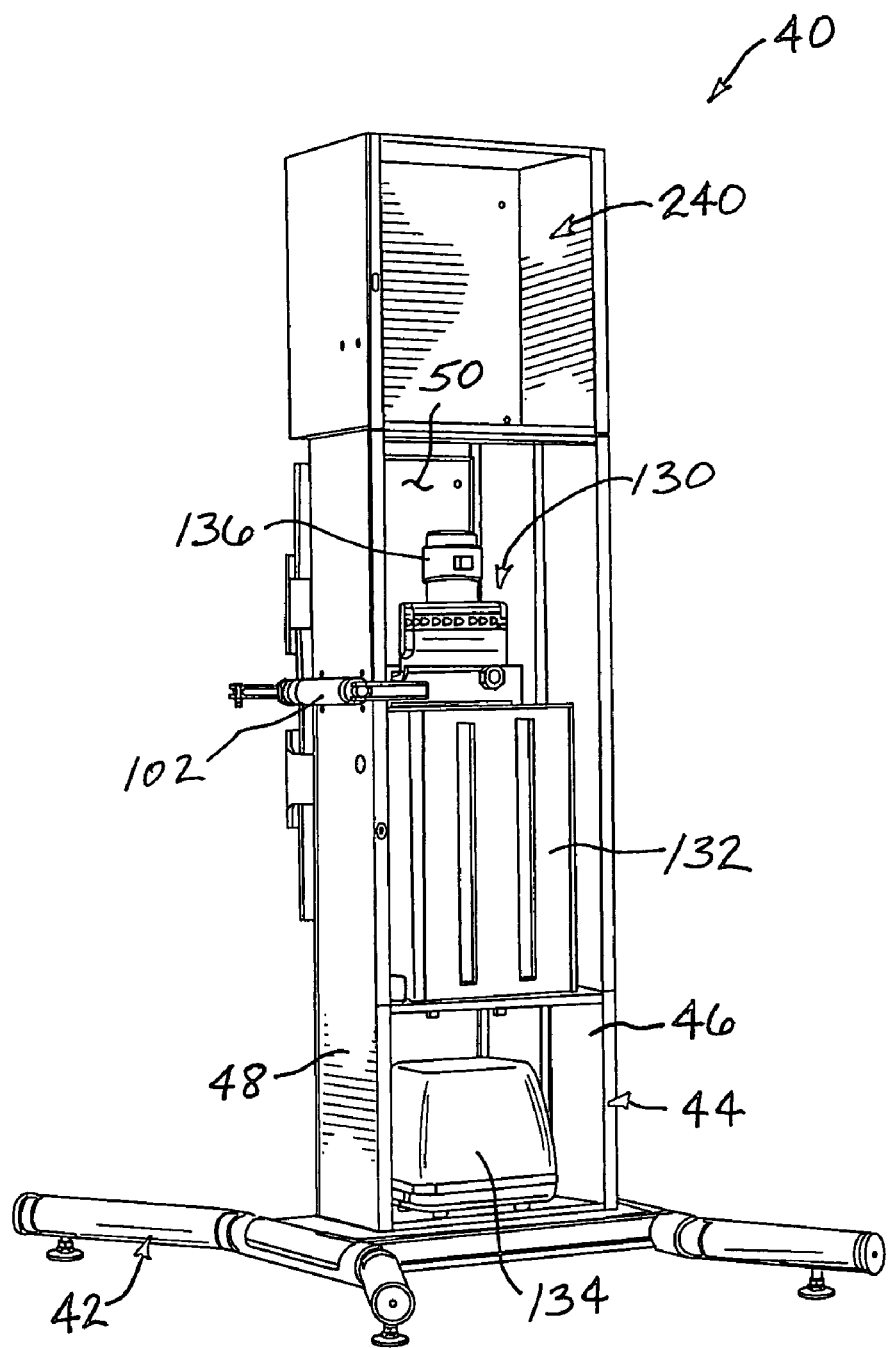
FIG. 2 is a perspective view, generally from a rear side, of the molding system.

With initial reference to FIGS. 1 and 2, a molding system 40 in accordance with one embodiment of the invention is depicted. The molding system has a base 42 that supports an upwardly extending frame 44. The frame includes a pair of spaced parallel side walls 46, 48 that are vertical in orientation, and a vertical front wall 50 that is joined to and extends between front edges of the side walls 46, 48. The frame 44 thus forms a three-sided structure that is open at the rear side (FIG. 2) of the system. Affixed to an upper end of the frame 44 is a foam cushion-making apparatus 60 operable for forming a generally closed bag of plastic film material containing a volume of a foam-forming composition. Various types and configurations of cushion-making apparatus can be used, the invention not being limited to any particular type or configuration. However, an advantageous cushion-making apparatus for use in the system 40 is described in commonly owned, co-pending U.S. patent application Ser. No. 11/411,708, filed on Apr. 26, 2006, entitled "METHOD AND APPARATUS FOR MAKING FOAM-IN-PLACE CUSHIONS WITH SELECTIVE DISTRIBUTION OF FOAM" (hereinafter referred to as "the '708 application"), the entire disclosure of which is hereby incorporated herein by reference. With reference to FIG. 1, the apparatus includes structure for rotatably mounting a supply roll 62 of a two-ply plastic film comprising two separate polymer film plies laid one upon the other and then wound about a hollow tubular core to form a roll of the two-ply film material. One ply of the two-ply film material unwinds from the supply roll 62 and proceeds downwardly past an idler roller 64, guided by one or more guide rods 66. The other ply of the two-ply film material unwinds from the supply roll and through a nip between the roll and another idler roller (not visible in FIG. 1), and then proceeds downwardly and is guided by another rod (not visible).

The cushion-making apparatus 60 includes a drive roller 68 that is rotatably mounted and is driven by a motor 70. The apparatus further includes a pair of transversely spaced, freely rotating driven rollers 72, 74 mounted on a shaft. The driven rollers 72, 74 form nips with the drive roller 68. The film plies are threaded through the nips between the driven rollers and the drive roller. The drive roller 68 includes an outer surface that is resiliently compressible and frictionally grips the film so that the film is driven by the drive roller substantially without slipping. For example, the drive roller can be formed of a rigid cylindrical roller covered with a sleeve of foam material such as silicone foam having a durometer hardness of 70 Shore A and having a thickness of about 0.25 inch. As illustrated, the driven rollers 72, 74 can have circumferential ridges that are spaced apart along the lengthwise direction of the rollers for imparting longitudinal ridges in the edges of the film plies, which gives rigidity to the film edges and also helps ensure that the film is driven straight out from the rollers and does not wrap around the drive roller 68.

The cushion-making apparatus further comprises a foam dispenser 76 that is mounted on a carriage 78 disposed between the two film plies. The carriage 78 is slidably mounted on a guide rail 80 that extends transversely. A rotatable feed screw 82 is rotatably mounted in the apparatus and is driven by a reversible motor 84. The feed screw engages a nut (not shown) on the carriage 78. Thus, rotation of the feed screw 82 in one direction causes the carriage 78 and dispenser 76 to move to the left along guide rail 80 in FIG. 1, and rotation of the feed screw in the opposite direction moves the carriage and dispenser to the right in FIG. 1. Variation in the rotational speed of the screw causes the speed of movement of the dispenser to be varied. The foam dispenser is fed by feed hoses (not shown) that feed two precursor chemicals to the dispenser, where the precursor chemicals mix (either internally within a mixing chamber of the dispenser, or externally upon being dispensed from the dispenser), to form a foam-forming composition. The composition is dispensed between the two plies of the polymer film material at a location just above (upstream of) the drive roller 68 and driven rollers 72, 74.

By controlling the movement (i.e., positioning and, optionally, speed) of the dispenser 76 in the transverse direction it is possible to dispense the foam-forming composition in any of various patterns. The possible patterns are further multiplied by driving the film plies while the composition is being dispensed (and optionally varying the speed of the film movement), and/or by momentarily interrupting the flow of the composition one or more times during the traversing of the dispenser 76 and/or during the movement of the film plies.

The cushion-making apparatus 60 also includes longitudinal sealing devices (not shown) for sealing the two film plies together along their longitudinal edges, and a transverse sealing and cut-off device (not shown) for sealing the plies together along transverse lines and severing a completed cushion from the continuous film material. Additionally, as described in the above-referenced co-pending patent application, the apparatus advantageously also includes a dispersion device structured and arranged to apply pressure on predetermined areas of the film portions towards each other so as to cause the foam-forming composition to be to be redistributed while the foam-forming composition is in a less than fully expanded state.

When the apparatus 60 is operated to form a cushion, the cushion is advanced downwardly from a lower end of the apparatus and hangs downwardly therefrom in front of a mold 90 for molding the cushion into a desired shape. The mold 90 is releasably mounted to a mold plate 92 fastened to the front wall 50 of the frame 44. More particularly, the mold plate 92 includes side flanges 94 projecting forwardly (generally perpendicular to the front wall 50) from its opposite longitudinal vertical edges, and slots 96 are defined in the flanges at vertically spaced locations along the height of the flanges. The mold 90 includes pins 91 (FIGS. 3 and 4) affixed to its lower end, which engage a selected pair of the slots 96 for restraining the mold in the vertical direction, and the upper end of the mold is provided with quick-release latches 98 that engage corresponding members on the mold plate to secure the mold in the apparatus. This releasable mounting system for the mold 90 allows the mold to be removed and replaced with another mold (possibly of different configuration) quickly and easily. The provision of multiple slots 96 at different heights allows molds of different vertical length to be mounted in the apparatus.

The mold 90 comprises a box of generally rectangular outer configuration. As further described below, the mold includes a door 100 that can be opened and closed by an actuator 102 such as a pneumatic cylinder as shown. The door is connected to the mold by long strap hinges 104 or the like. When the door is open, a cushion advanced downwardly from the cushion-making apparatus 60 is positioned in front of the mold so that the cushion can be received into the mold.

Figure 3:
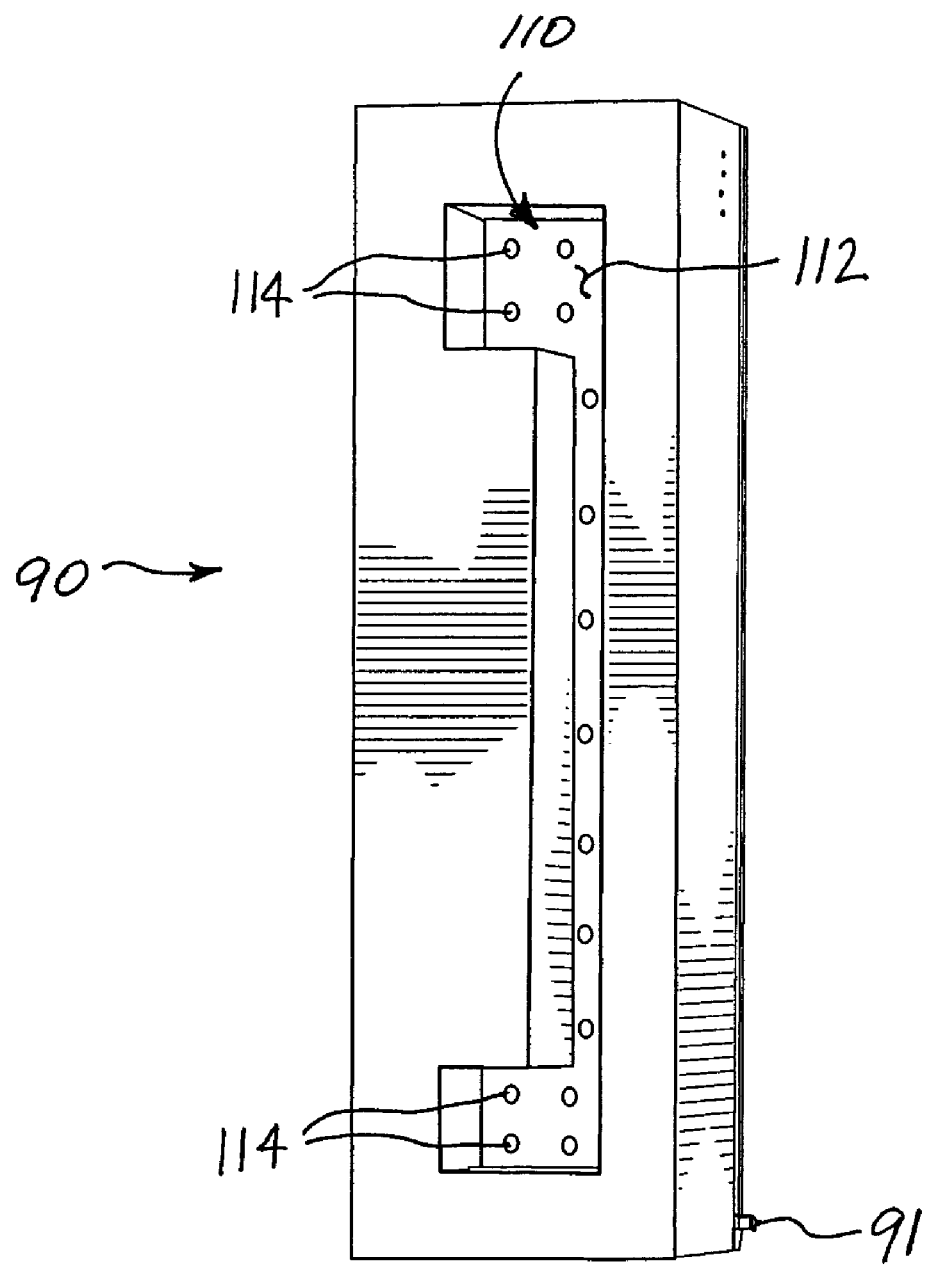
FIG. 3 is a perspective view, generally from a front side, of a mold in accordance with one embodiment.
Figure 4:
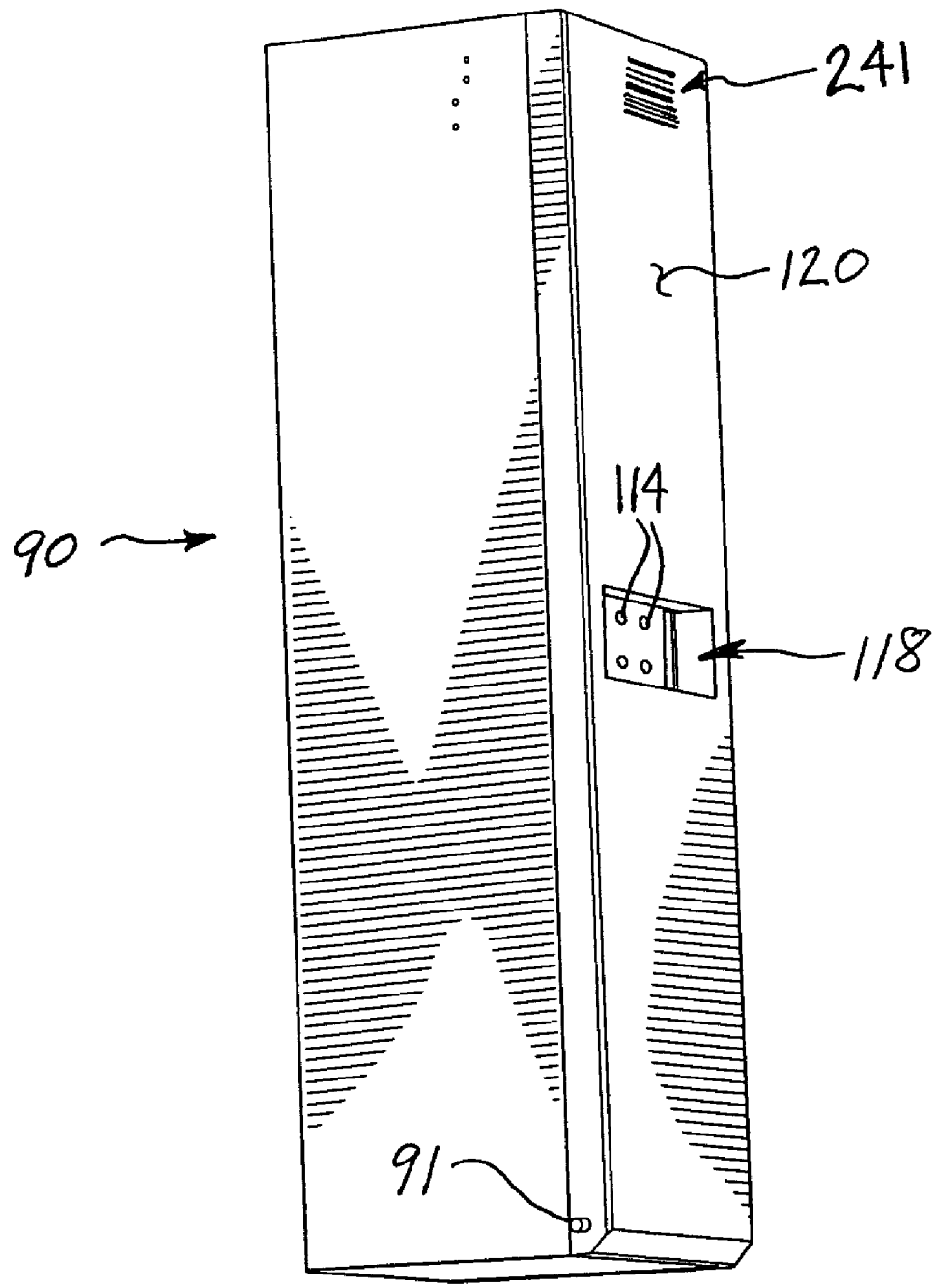
FIG. 4 is a perspective view, generally from a rear side, of the mold.
Figure 5:
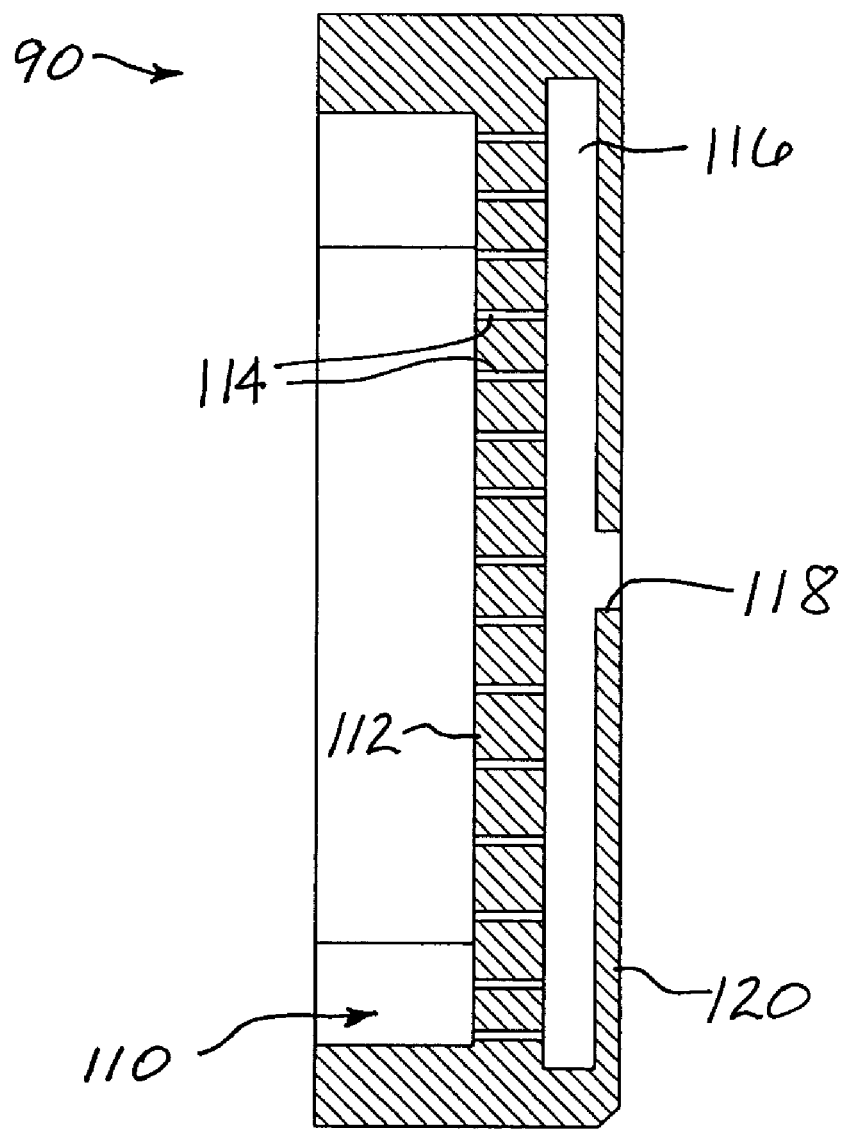
FIG. 5 is a cross-sectional view through the mold.

With reference to FIGS. 3 through 5, the mold 90 defines a mold cavity 110 configured as a negative impression of the desired shape of the cushion to be produced. The mold cavity has an open side at the front of the mold adjacent the door 100 (FIG. 1). As used herein, a "door" comprises any structure or device capable of closing the open side of the mold to constrain an expanding cushion in the mold to remain in the mold cavity. In a bottom wall 112 of the mold cavity, a plurality of air passages 114 are provided, spaced apart along the bottom wall. On an opposite side of the bottom wall 112 from the cavity 110, the mold defines an air plenum 116 that extends the length and width of the cavity 110. The air passages 114 extend between the cavity 110 and the air plenum 116. A port 118 extends from the air plenum 116 to an exterior rear face 120 of the mold 90. Thus, there is fluid communication between the mold cavity 110 and the air plenum 116 via the air passages 114, and there is fluid communication between the air plenum 116 and the exterior of the mold via the port 118. A single port 118 is shown, but alternatively the mold can employ more than one port.

Figure 6:
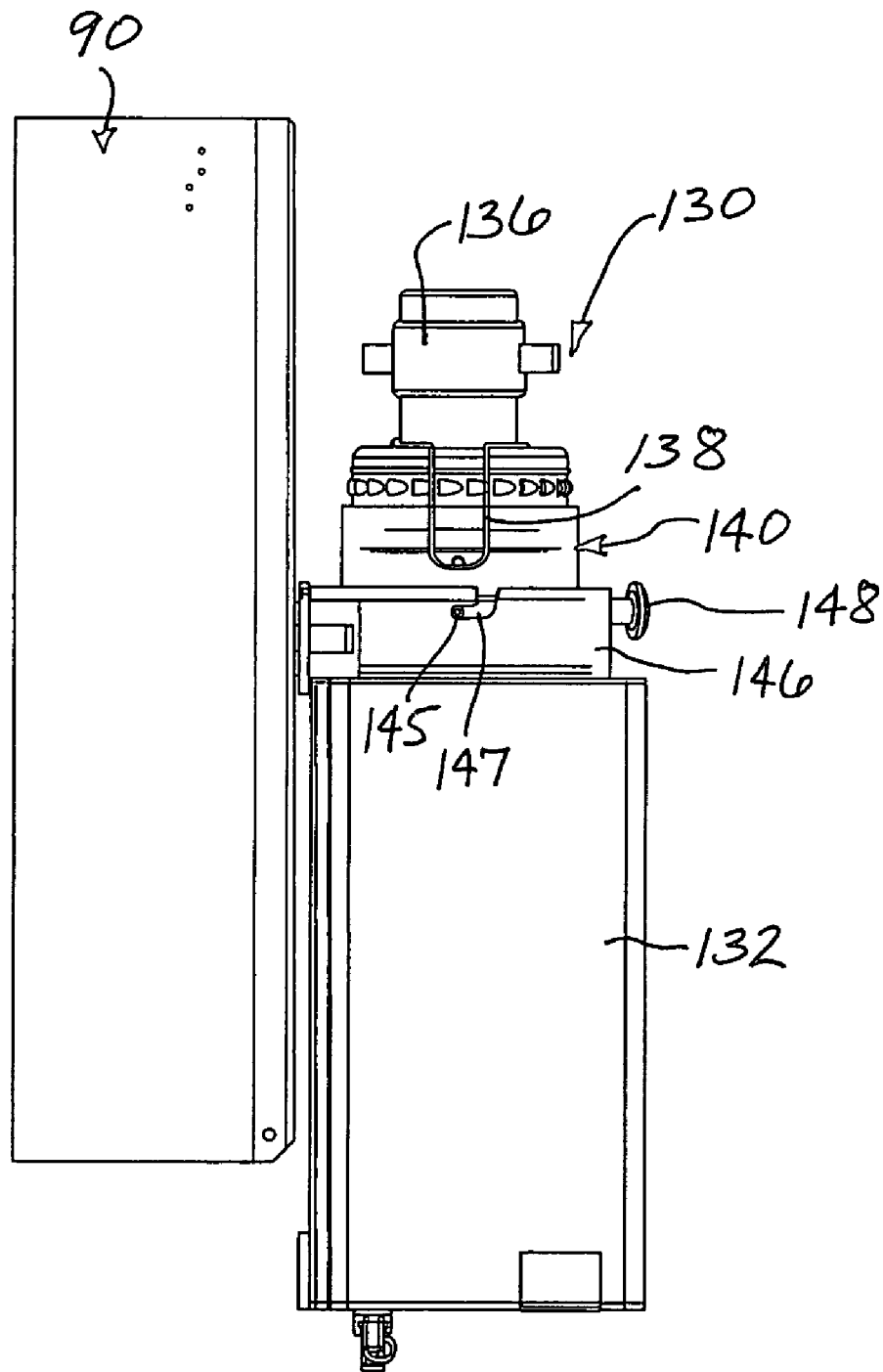
FIG. 6 is a side elevation of the mold connected with a vacuum/blowout system in accordance with one embodiment.

With reference to FIGS. 2 and 6, the system 40 includes a vacuum/blowout system 130 mounted within the open rear side of the frame 44. The vacuum/blowout system is connected with the port of the mold 90 for alternately either exerting a vacuum through the port for suctioning a cushion into the mold cavity, or supplying pressurized air through the port for expelling a completed cushion from the mold cavity. The mold plate 92 and the front wall 50 of the frame 44 include openings (not shown) to accommodate the connection of the vacuum/blowout system to the port of the mold. The vacuum/blowout system 130 includes an air tank 132 for holding pressurized air supplied by an air compressor 134. The air compressor is connected to the air tank by a suitable air line (not shown) and a controllable valve (not shown) so that the valve can be opened when the air compressor is running in order to supply compressed air into the air tank, and then the valve can be closed and the compressor can be turned off. The vacuum/blowout system 130 further comprises a vacuum motor 136 for exerting suction through the port of the mold.

Figure 7:
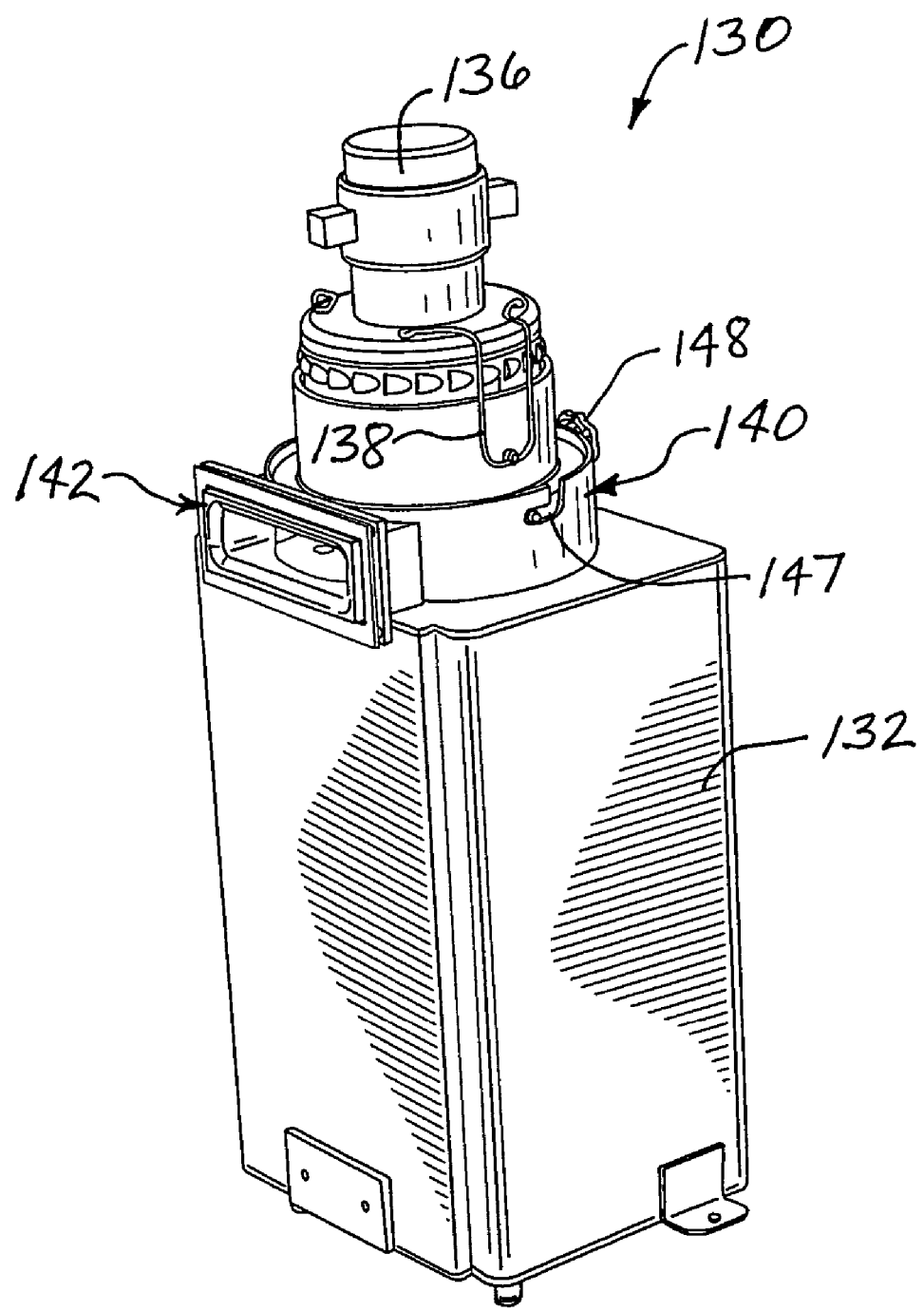
FIG. 7 is a perspective view of the vacuum/blowout system.
Figure 8:
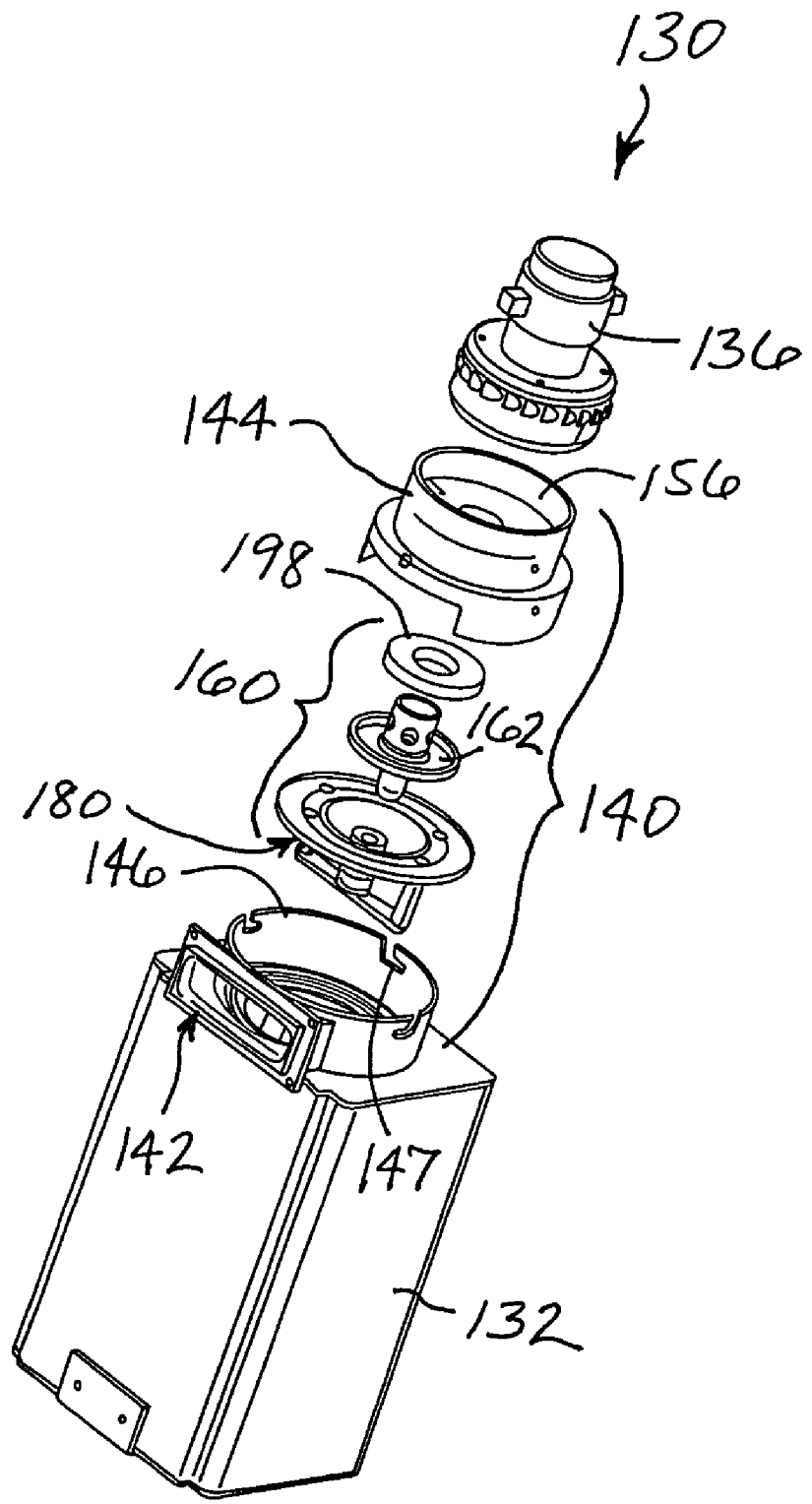
FIG. 8 is an exploded perspective view the vacuum/blowout system.

FIG. 7 shows the vacuum/blowout system 130 in isolated perspective view, and FIG. 8 shows the system in exploded view. The air tank 132 includes a valve cap assembly 140. The vacuum motor 136 is releasably mounted to the valve cap assembly 140 by wire bails 138 or the like. The valve cap assembly defines a mating structure 142 for engaging the port of the mold in a substantially sealed manner so as to establish a flow path between the mold port and an air chamber defined within the valve cap assembly as further described below.

Figure 12:
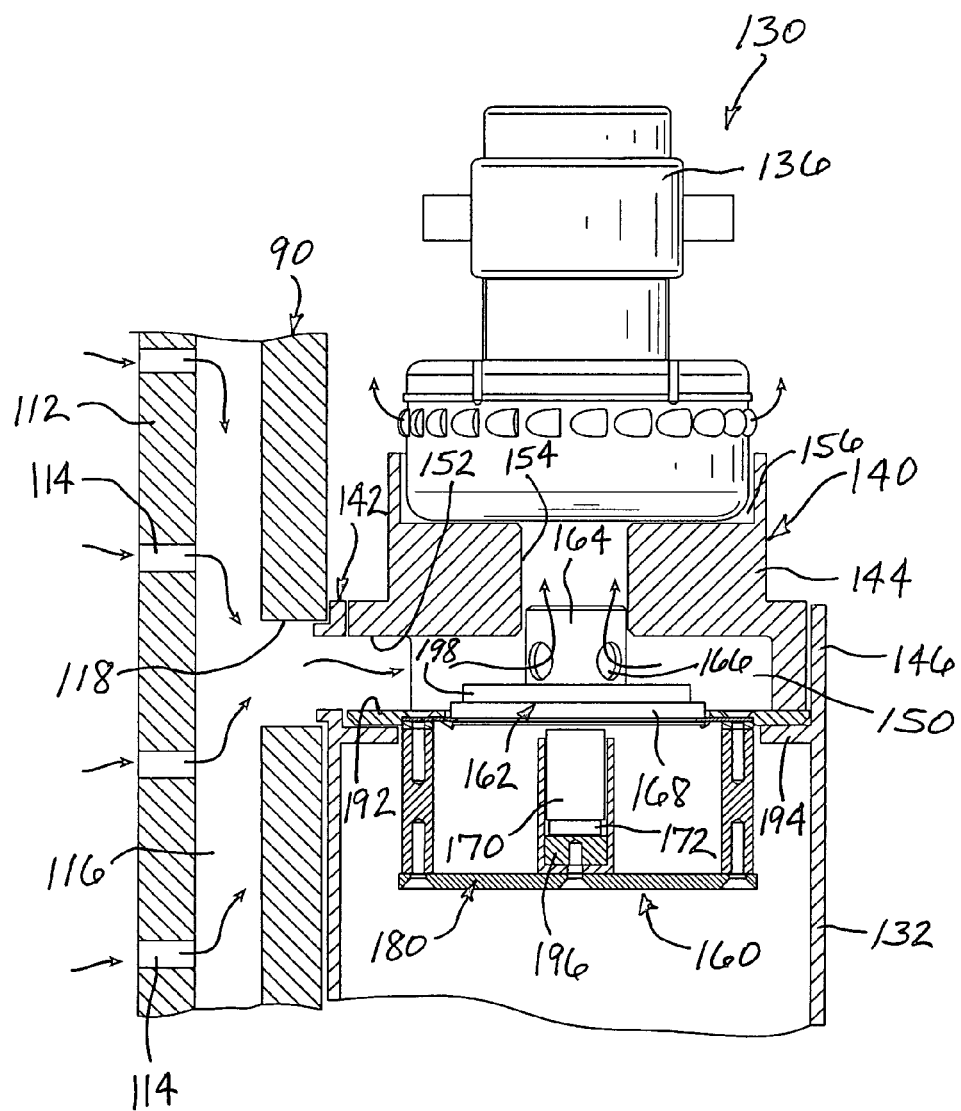
FIG. 12 is a side view, partly in section, of the mold and vacuum/blowout system in a vacuum mode of operation.
Figure 13:
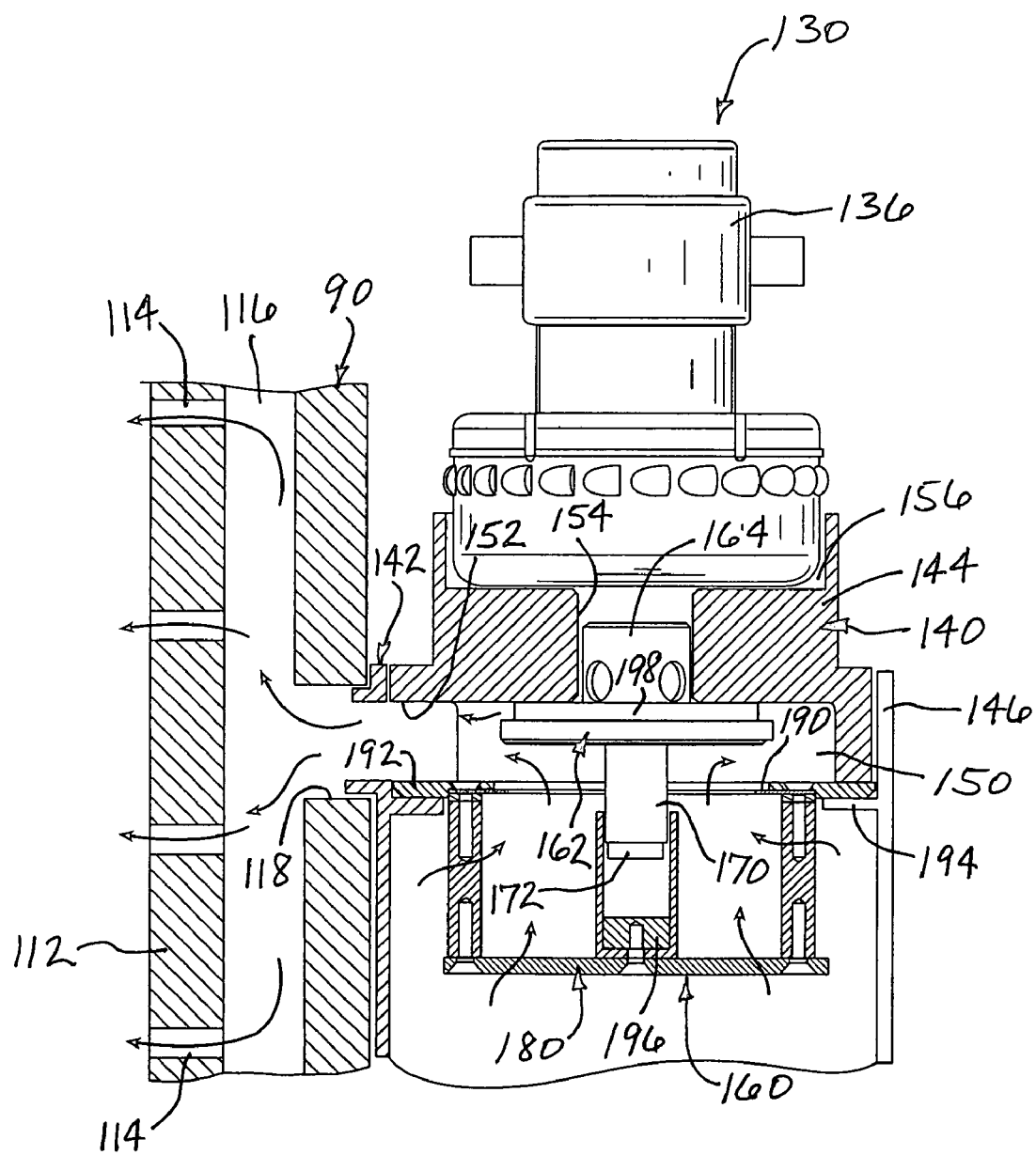
FIG. 13 is a view similar to FIG. 13, showing a blowout mode.

With primary reference to FIGS. 6, 8, 12, and 13, the valve cap assembly 140 includes a cap 144 that engages the air tank 132 and closes an open end of the tank. The tank includes a mounting collar 146 comprising a structural part of the tank weldment and defining L-shaped slots 147 engaged by pins 145 on the cap 144 (as best seen in FIG. 6) and a hand wheel nut 148 is provided for securing the cap 144 to the collar 146. Other "quick-release" mounting mechanisms for attaching the cap to the tank can be used instead of the illustrated L-shaped slots, pins, and hand wheel. Referring particularly to FIGS. 12 and 13, the cap 144 defines an air chamber 150. The air chamber has an inlet/outlet passage 152 that is coupled via the mating structure 142 to the port 118 of the mold 90. The lower end of the cap 144 defines an opening or port that is arranged to be connected to the interior of the air tank 132 when the shuttle valve 160 (to be described below) is in a blowout position as in FIG. 13, and this port is connected to the air chamber 150. The upper end of the cap defines a second port 154 as a cylindrical passage extending from the air chamber 150 to a recess formed in the upper surface of the cap for receiving a lower end of the vacuum motor 136. Accordingly, the vacuum motor is in communication with the port 154 and thus with the air chamber 150 when the shuttle valve is in a vacuum position as in FIG. 12.

Figure 9:
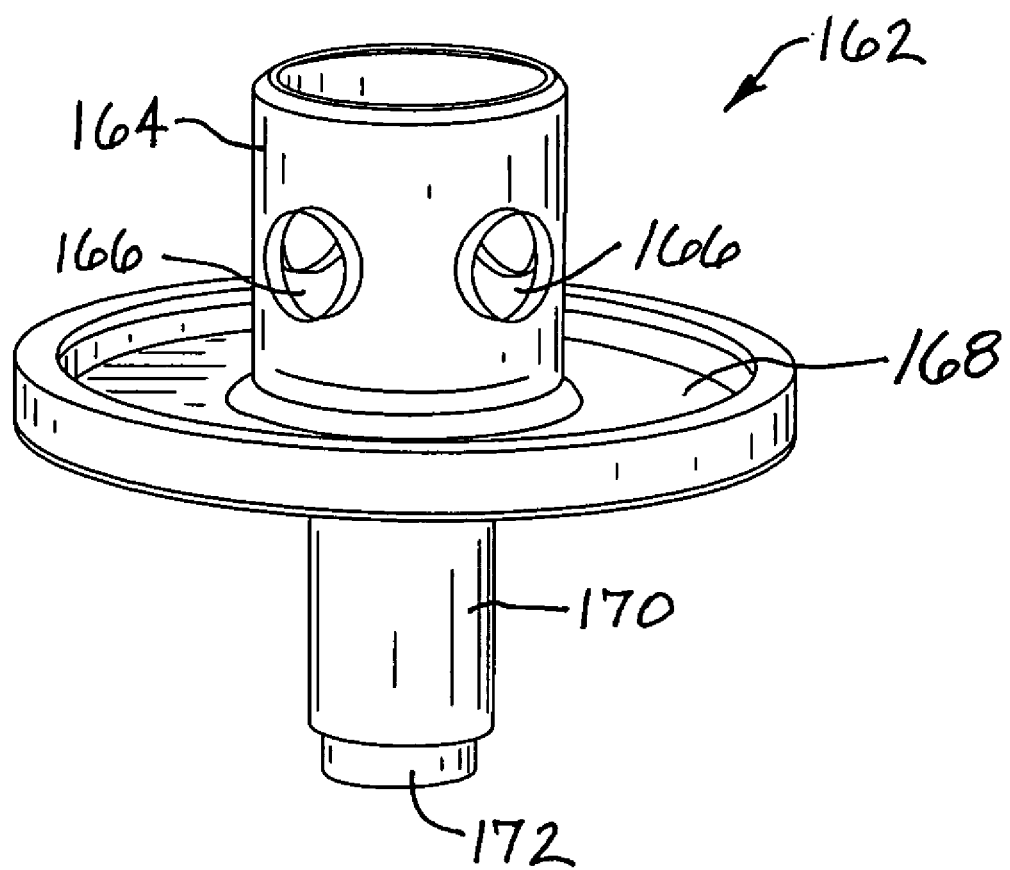
FIG. 9 is a perspective view of a valve member of a magnetic shuttle valve included in the vacuum/blowout system in accordance with one embodiment.

The shuttle valve 160 is now described in detail. The shuttle valve includes a valve member 162 (shown in isolation in FIG. 9) having an upper tubular portion 164 defining a plurality of apertures 166 through the side wall thereof into the interior of the tubular portion. The tubular portion 164 is received in the cylindrical passage 154 of the cap 144, which forms a guide for movement of the tubular portion along the axis of the passage. The tubular portion 164 forms a loose fit with the inner surface of the passage 154 so that air is generally discouraged from flowing between the outer surface of the tubular portion and the inner surface of the passage and the tubular portion slides freely within the passage. The lower end of the tubular portion 164 is affixed to an annular portion 168 of larger diameter than the tubular portion that is configured to engage a valve seat (described below) for blocking the connection between the air tank and the chamber 150 of the cap 144 when the valve member is in the vacuum position (FIG. 12). When the valve member 162 is moved to the blowout position (FIG. 13), the annular portion 168 disengages the valve seat to place the air tank in communication with the chamber 150.

Figure 10:
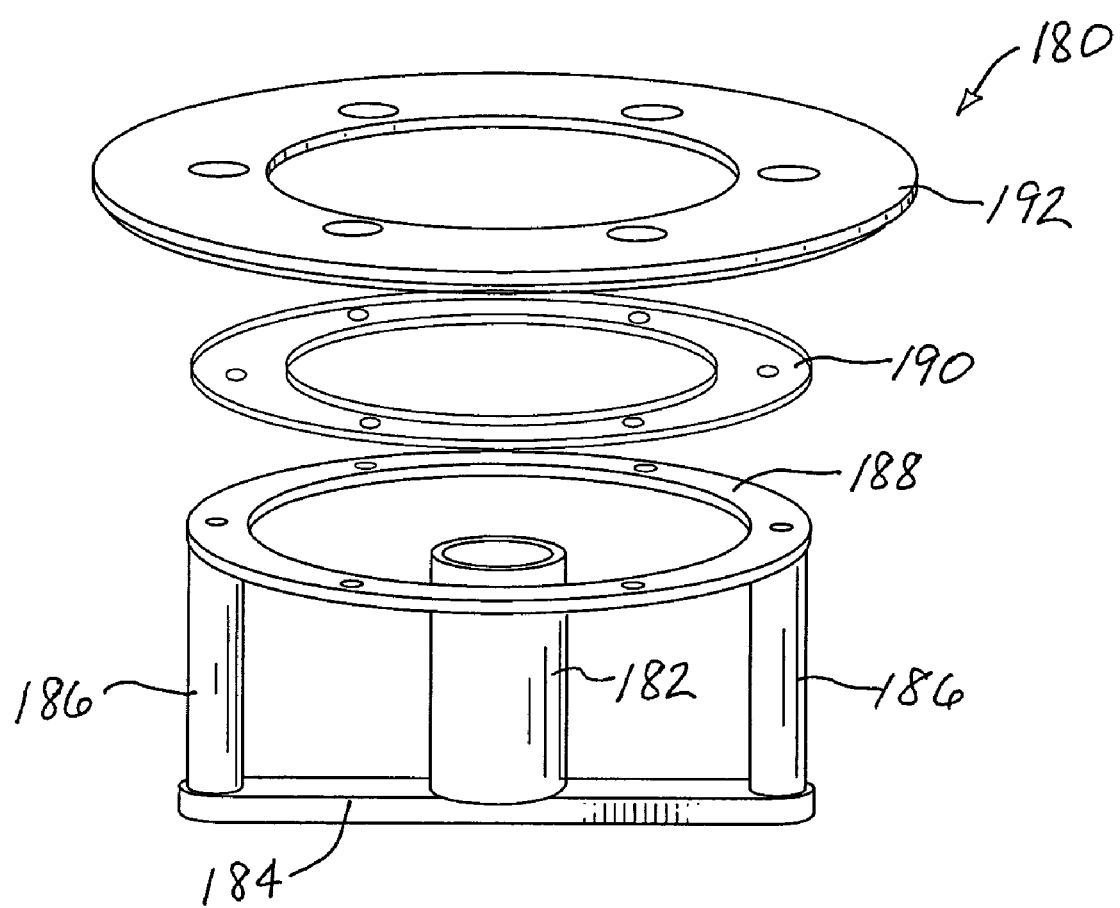
FIG. 10 is an exploded perspective view of a magnet and seal assembly of the magnetic shuttle valve.
Figure 11:
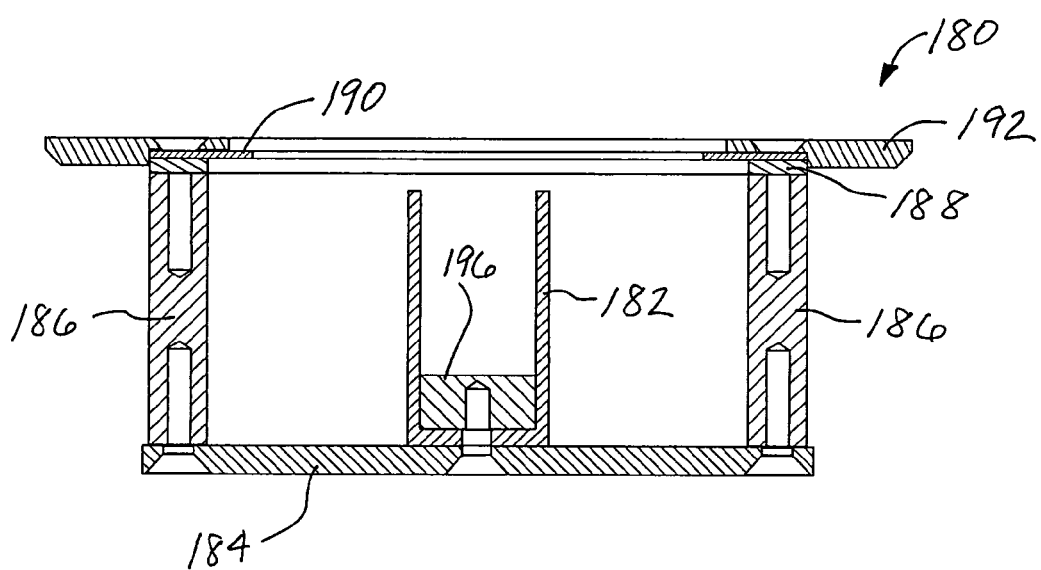
FIG. 11 is a cross-sectional view through the magnet and seal assembly.

The valve member 162 further comprises a lower guide portion 170 that extends downwardly from the annular portion 168 and is generally cylindrical in outer shape. A magnetically permeable portion or member 172 is disposed on the bottom end of the guide portion 170. For example, the portion or member 172 can be a disk of a ferrous metal. The guide portion 170 is slidably received in a cylindrical guide passage of a valve guide/seat assembly 180 that is mounted to the air tank 132. The valve guide/seat assembly 180, shown in isolation in FIGS. 10 and 1, comprises a tubular guide member 182 for receiving the guide portion 170 of the valve member 162. The tubular guide member 182 is mounted generally at a midpoint of a cross bar 184 and projects upwardly from the cross bar. Vertical support posts 186 are affixed to the opposite ends of the cross bar and project upwardly therefrom. An upper support ring 188 is affixed atop the support posts 186 and is substantially coaxial with the tubular guide member 182. A ring-shaped valve seat 190 is affixed to the support ring 188 by way of a mounting ring 192 that sandwiches the valve seat between the mounting ring and the support ring. The mounting ring 192 has a larger outer diameter than the support ring 188 and valve seat 190. The inner diameter of the valve seat 190 is smaller than that of the mounting ring 192 and support ring 188. The inner diameter of the mounting ring 192 is slightly larger than the outer diameter of the annular portion 168 of the valve member 162. Accordingly, the annular portion 168 can engage the part of the valve seat 190 that extends radially inwardly beyond the inner edge of the mounting ring 192, so as to form a seal against the valve seat.

The outer peripheral portion of the mounting ring 192 that extends radially outwardly beyond the support ring 188 engages a radially inwardly extending annular flange 194 on the air tank 132, as best seen in FIGS. 12 and 13. The mounting ring 192 is captured between this flange 192 and the cap 144 secured to the tank as previously noted, thereby securing the valve guide/seat assembly 180 to the air tank.

Mounted in the lower end of the guide passage of the tubular guide member 182 is a magnet 196. The guide member 182 and magnet 196 are configured and positioned such that when the annular portion 168 of the valve member 162 is seated against the valve seat 190, the magnetically permeable portion or member 172 of the guide portion 170 either is in contact with the magnet 196 or is spaced by a small gap distance from the magnet (see FIG. 12, which shows contact with the magnet). The magnetic attraction force of the magnet 196 on the magnetically permeable portion 172 of the valve member pulls the annular portion 168 of the valve member against the valve seat 190, sealing the air tank, as in FIG. 12. This is the vacuum position of the magnetic shuttle valve. In this position, the port 118 of the mold 90 is in fluid communication with the air chamber 150 in the cap 144, and thus with the port 154 that connects with the vacuum motor 136, by virtue of the apertures 166 in the tubular portion 164 of the valve member. Accordingly, operation of the vacuum motor 136 exerts a vacuum through the port 118 so as to subject the air plenum 116 of the mold to a sub-atmospheric pressure. This sub-atmospheric pressure is exerted on the mold cavity via the air passages 114 in the mold. Therefore, a cushion placed in front of the open side of the mold cavity will be drawn by suction into the mold cavity.

FIG. 13 shows the magnetic shuttle valve in the blowout position. The valve member 162 is moved to this position when air pressure within the air tank 132 exerts a greater force on the valve member 162 than the magnetic attraction force of the magnet 196. When the air pressure becomes sufficiently high, the valve member is urged upwardly until the annular portion 168 abuts an inner surface of the air chamber 150 surrounding the air passage 154. The valve member 162 can include a bumper or cushioning member 198 on the upper surface of the annular portion 168 for cushioning the impact between the valve member and the inner surface of the air chamber, since the movement of the valve member to the blowout position can be rapid.

Figure 14:
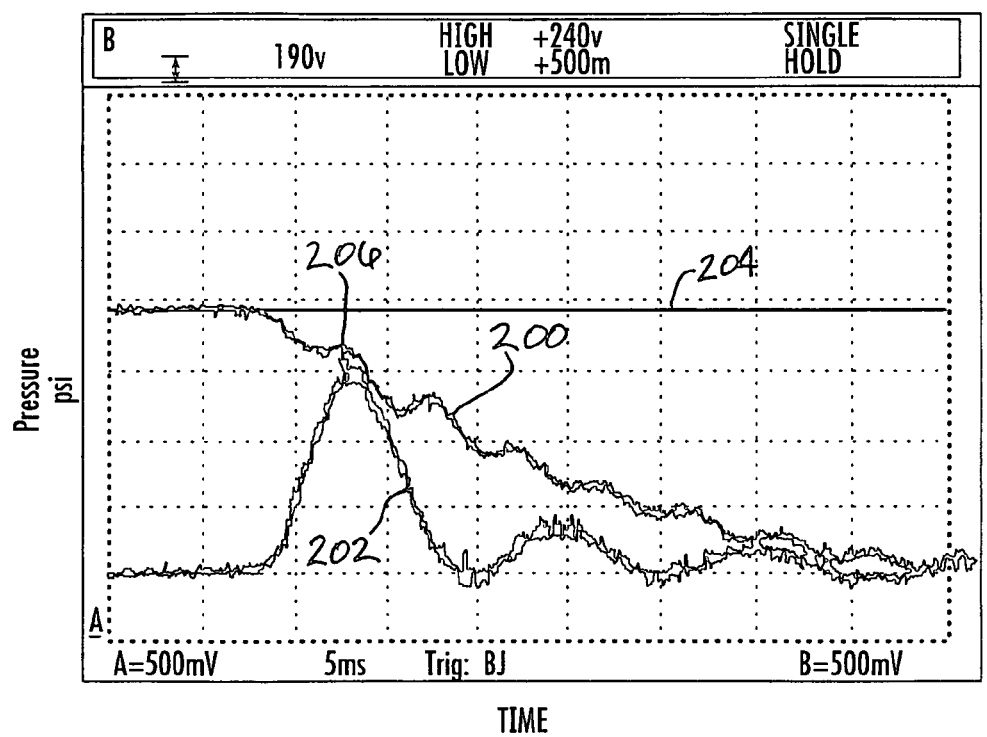
FIG. 14 is an oscilloscope trace of the pressure within the air tank of the vacuum/blowout system and the pressure within the air plenum of the mold as a function of time during a blowout cycle of operation.

The operation of the vacuum/blowout system 130 is now described with reference to FIGS. 12 through 14. FIG. 14 shows the pressure 200 within the air tank 132 as measured by a pressure sensor, as a function of time during one blowout cycle of the system. Also shown is the pressure 202 within the air plenum 116 of the mold 90 as a function of time. When the pressure in the air tank builds to a predetermined value 204, the air pressure overcomes the magnetic attraction force on the valve member 162 and urges the valve member to the blowout position as in FIG. 13. It can be seen from the pressure traces in FIG. 14 that the pressure within the air tank then begins to drop as air rushes from the air tank, through the air chamber 150 of the cap 144 and out the passage 152 into the port 118 of the mold. Correspondingly, the air pressure within the air plenum 116 of the mold rapidly increases up to a peak pressure 206, which is less than the pressure 204 in the air tank required for opening the valve. This increase of pressure in the air plenum occurs rapidly; the oscilloscope trace indicates approximately 5 ms elapses between the opening of the valve and the peak pressure condition in the air plenum. This quick burst of air pressure in the air plenum is communicated to the mold cavity via the air passages 114, which results in the cushion being expelled from the open side of the mold cavity. After the blowout, the valve 160 closes on its own by virtue of gravity, which causes the valve member 162 to fall back down such that the magnet 196 again engages the portion 172 on the valve member and holds the valve member closed for the next blowout operation.

The air pressure pulse must be rapid to expel the cushion from the mold. A longer, slower pulse is ineffective to expel the cushion completely because as the cushion begins to exit the mold it loses contact with the side walls of the mold cavity and air can pass around the cushion, leaving the cushion partially in the mold. With a rapid pressure pulse, the cushion's inertia causes it to eject completely before leaking air can have any deleterious effect. For a given configuration of air passages, air plenum, and mold cavity, the required volume of air in the air tank 132 to achieve the desired rapid pressure pulse is dependent on the pressure in the tank when the magnetic shuttle valve opens. The magnetic shuttle valve 160 can be designed to open at any of a range of pressures, by selecting the area of the valve exposed to the air pressure in the tank and the magnetic attraction force provided by the magnet 196 such that a desired air pressure will open the valve. The magnetic attraction force can be varied by varying the diameter of the magnet 196 and/or its thickness, and/or by varying the diameter of the magnetically permeable portion 172 of the valve member, and/or by varying a gap distance between the magnet and the magnetically permeable portion.

In one embodiment of the invention, an air pressure of approximately 4 psi for opening the valve is selected. In this embodiment, a 6-gallon air tank 132 has been found to be effective. Alternatively, however, the system could be designed with a 3-gallon tank at 8 psi opening pressure, with a 12-gallon tank at 2 psi opening pressure, etc. A smaller tank (e.g., 6 gallons or less) generally is preferred for reasons of compactness of the apparatus. On the other hand, there are advantages to keeping the opening pressure low. For instance, if the opening pressure is less than 7.2 psi, the air pressure tank is generally not deemed to be a "pressure vessel" subject to certain governmental regulations for pressure vessels. Another advantage of low opening pressure is that the air tank can be pressurized with a low-pressure onboard compressor 134 (FIG. 2), thereby eliminating the need to use high-pressure shop air at a user's facility. One suitable low-pressure compressor that is useful in this regard is the HP Series linear compressor from Hiblow USA of Saline, Mich.

For the blowout operation to work efficiently, pressure losses between the air tank 132 and the mold cavity 110 must be minimized. Pressure losses generally result from restrictions in the system that create flow resistance, as well as from expansion of the air. Flow restrictions can be reduced by making all air flow passages larger, but this increases the overall volume that must be filled by air from the air tank before the cushion can be ejected. Thus, the flow restriction losses and the expansion losses generally work against each other—a design change that favors one will typically hurt the other. These factors must be selected to reach a suitable compromise. In one embodiment of the invention, employing a 6-gallon air tank at an opening pressure of about 4 psi as noted above, it has been found that a suitable compromise is provided by configuring the system such that no portion of the air passages between the air tank and the air plenum is smaller than 3.5 square inches in flow area. Efficiency rapidly decreases as the flow area falls below 3.5 square inches. The flow area through the shuttle valve opening at the air tank discharge can be about 11 square inches. Making this flow area large does not adversely affect the total volume of the system because the length of this large flow area is very small and the air then transitions immediately into the air chamber 150 of substantially smaller flow area.

The total flow area of the air passages 114 connecting the air plenum 116 to the mold cavity 110 should also be at least 3.5 square inches in this embodiment.

Figure 15:
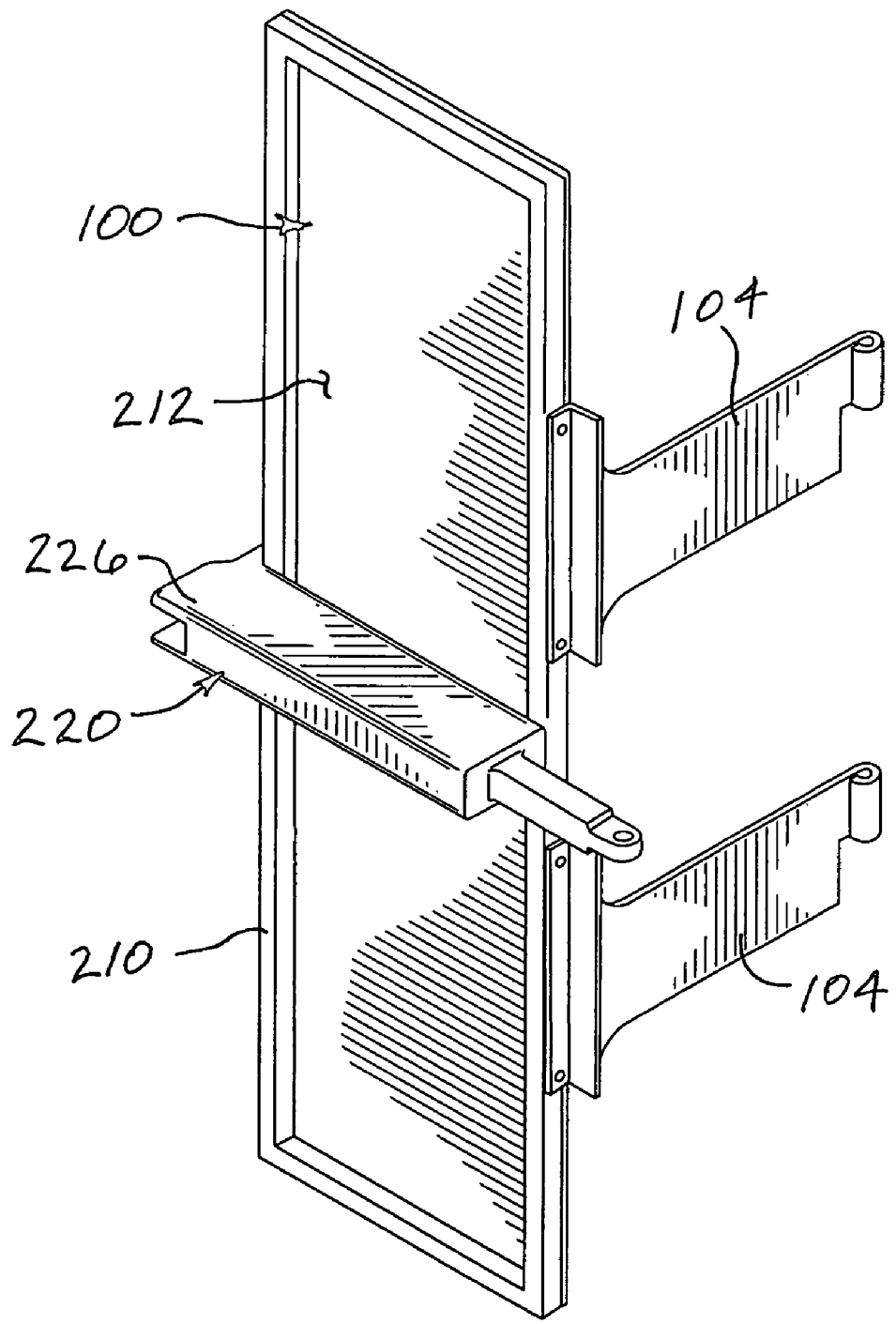
FIG. 15 is a perspective view of a door and hinge assembly for the mold in accordance with one embodiment of the invention.

The system for opening and closing the mold 90 is now described with reference to FIGS. 15 through 18. FIG. 15 shows the mold door 100 and its associated strap hinges 104. The door can comprise a rectangular frame 210 formed of square metal tube, and a backing panel 212 affixed to the frame. The backing panel can comprise a plastic such as polyethylene or the like. Each of the strap hinges 104 has one end rigidly affixed to the frame 210 at one edge of the door, and an opposite end of the hinge receives a hinge pin 105 affixed either to the mold adjacent its rear side or to the mold mounting plate 92 (FIG. 1). An advantage of mounting the door to the mold mounting plate is that the mold can be removed without removing the door. In either case, the strap hinges rotate about the hinge pins. The door also includes a latch mechanism 220 for latching the door in the closed position.

Figure 16:
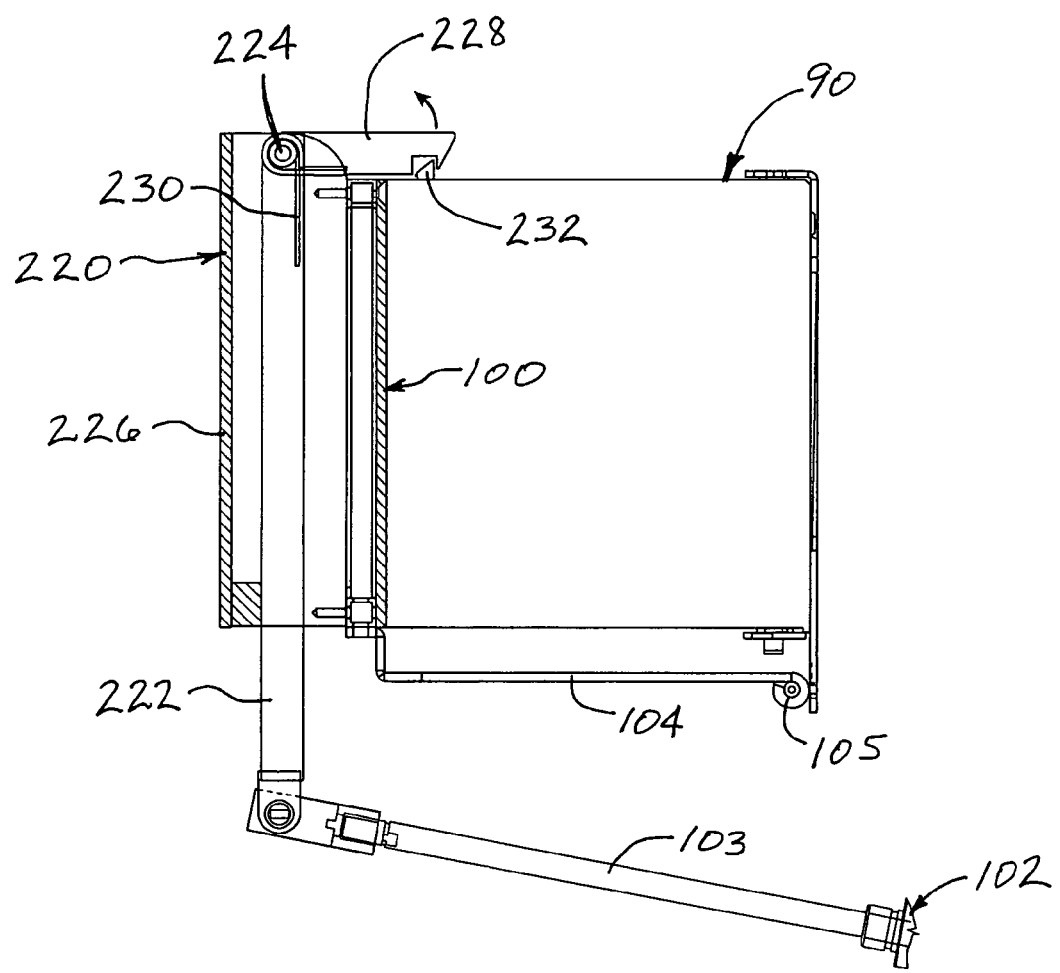
FIG. 16 is a top elevation, partly in section, showing the mold and the actuator and associate linkage for the mold door, with the door closed and latched by a latch mechanism.
Figure 17:
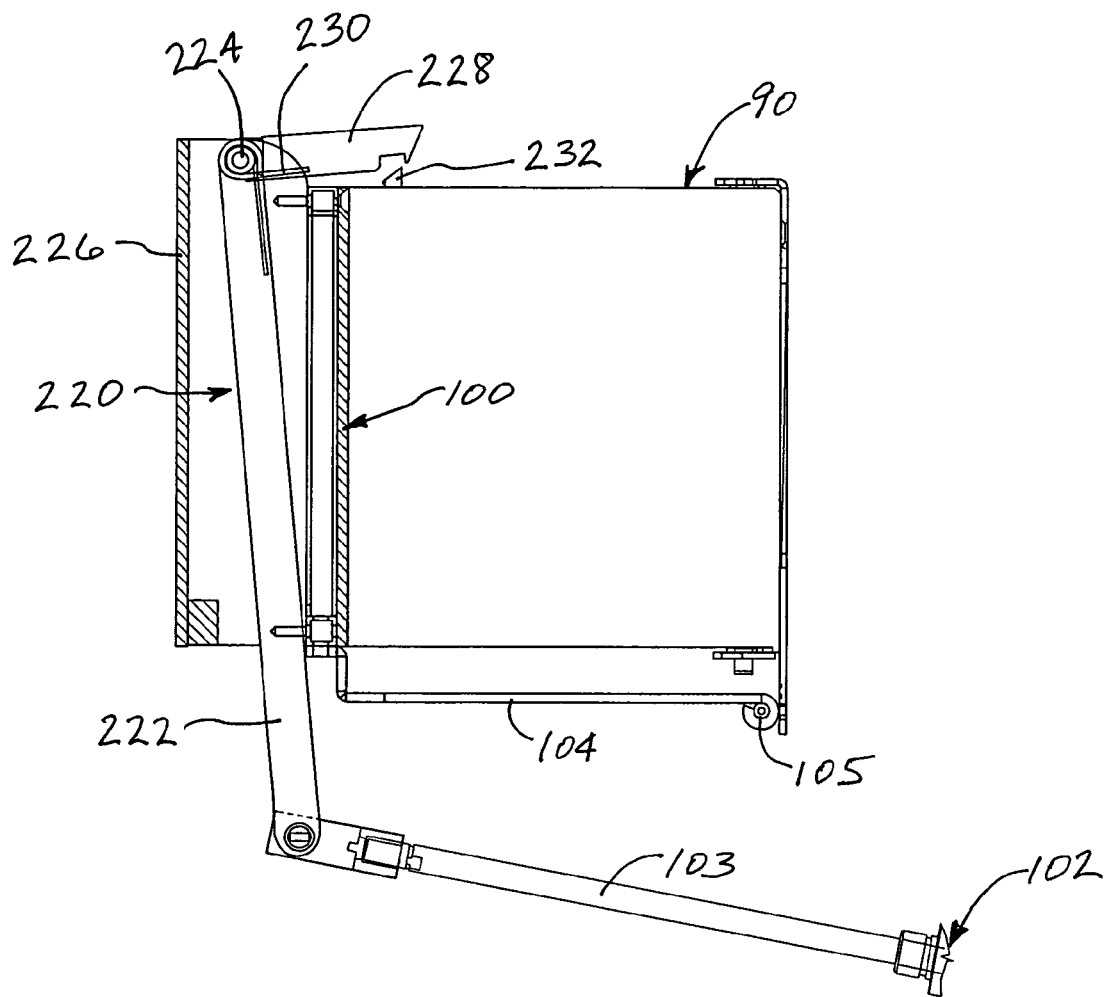
FIG. 17 is a view similar to FIG. 16, showing the latch mechanism being unlatched to permit the door to open.
Figure 18:
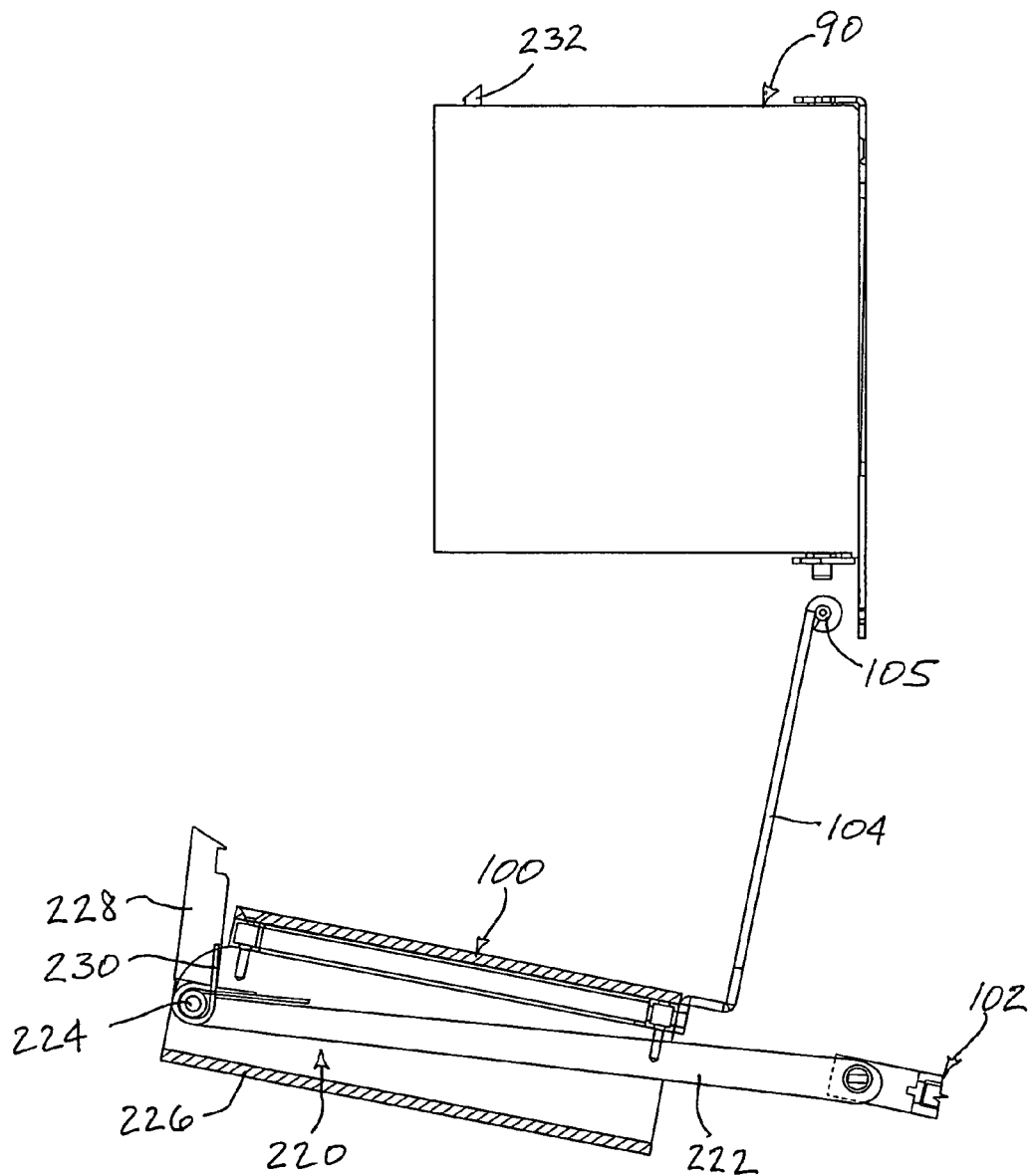
FIG. 18 shows the mold having been opened by the actuator and linkage.

The structure and operation of the latch mechanism 220 are described with particular reference to FIGS. 16 through 18. FIG. 16 shows the door 100 in its closed position against the mold 90. The latch mechanism includes a lever 222 having one end pivotally connected to the end of the rod 103 of the pneumatic cylinder 102 for opening and closing the door. The opposite end of the lever 222 is pivotally connected to a hinge pin 224 affixed within a hollow support member 226 fastened to a front side of the door 100. The lever 222 passes through the central passage of the hollow support member 226. A latch 228 is also pivotally connected to the hinge pin 224 and projects rearwardly from the end of the lever 222 at a generally perpendicular angle relative to the lever. The latch 228 can pivot independently of the lever 222. A torsion spring 230 urges the latch in a first rotational direction (clockwise in FIG. 16) about the hinge pin 224, but the latch mechanism is configured such that the rotation of the latch relative to the lever is limited in this first direction, and in particular the latch cannot rotate in the first direction past a perpendicular orientation relative to the lever. A suitable stop is provided for this purpose.

The latch mechanism includes a catch 232 affixed to the mold 90 on an exterior side surface thereof opposite from the side near the strap hinges 104. The catch is positioned adjacent a front side of the mold so that it can be engaged by the latch 228. The latch 228 includes a detent or recess configured to receive the catch, as shown in FIG. 16. In this latched position of the latch mechanism, internal pressure in the mold exerted on the door 100 cannot open the door.

To open the door at the completion of a molding operation, the pneumatic cylinder 102 is actuated to retract the cylinder rod 103, thereby pulling on the lever 222 and causing it to pivot about the hinge pin 224 (counterclockwise in FIG. 16). Because of the stop provided between the latch 228 and the lever 222, the latch 228 therefore also pivots counterclockwise about the hinge pin and thus is disengaged from the catch 232, as shown in FIG. 17. The door 100 is now free to open. Further retraction of the cylinder rod 103 does not result in further pivoting of the lever 222 because the hollow support member 226 limits the pivoting of the lever. Accordingly, the continued retraction of the cylinder rod causes the door to pivot about the hinge pins 105 for the strap hinges 104, thereby opening the door as shown in FIG. 18. Advanta-geously, the location of the hinge pins 105 remote from the open side of the mold causes the door 100 to be moved completely clear of the open side of the mold in its open position. This allows a clear path for the advancement of a cushion from the cushion-making apparatus 60 (FIG. 1) into a position in front of the open side of the mold in preparation for operation of the vacuum/blowout system to suck the cushion into the mold to start another molding cycle.

To close the door after the cushion is sucked into the mold cavity, the cylinder rod 103 is extended to move the door toward the closed position. With reference to FIG. 16, as the latch 228 engages the catch 232 just before the door fully closes, the latch is pivoted in a second direction (counter-clockwise in FIG. 16) relative to the lever 222, against the moment provided by the torsion spring 230. This pivoting action is caused by the ramped exterior surface of the catch, which acts as a cam as the latch rides along it. Once the latch has moved far enough to fall off the rear end of the ramped surface, the latch 228 is urged by the torsion spring 230 back to its limiting perpendicular position and the catch 232 enters the recess in the latch, thus latching the door closed. An advantage of using such a latching mechanism is that the actuator 102 for the door does not have to provide the force for keeping the door closed against the pressure of the expanding cushion in the mold cavity.

Advantageously, the pneumatic cylinder 102 for opening and closing the door and operating the latch mechanism is powered by the same onboard compressor 134 used for pressurizing the air tank 132. This arrangement is simple and cost-effective. Alternatively, other types of actuators could be used for opening and closing the door. As noted, the latching mechanism keeps the door closed against the pressure of the expanding cushion. Accordingly, the door actuator 102 need provide only enough force to open and close the door, and therefore the compressor 134 can operate at low pressure and can be part of the system 40, as opposed to having to use high-pressure shop air from a central air supply separate from the system. Additionally, the door opening and closing forces are low and thus there is no safety hazard associated with the door.

Figure 19:
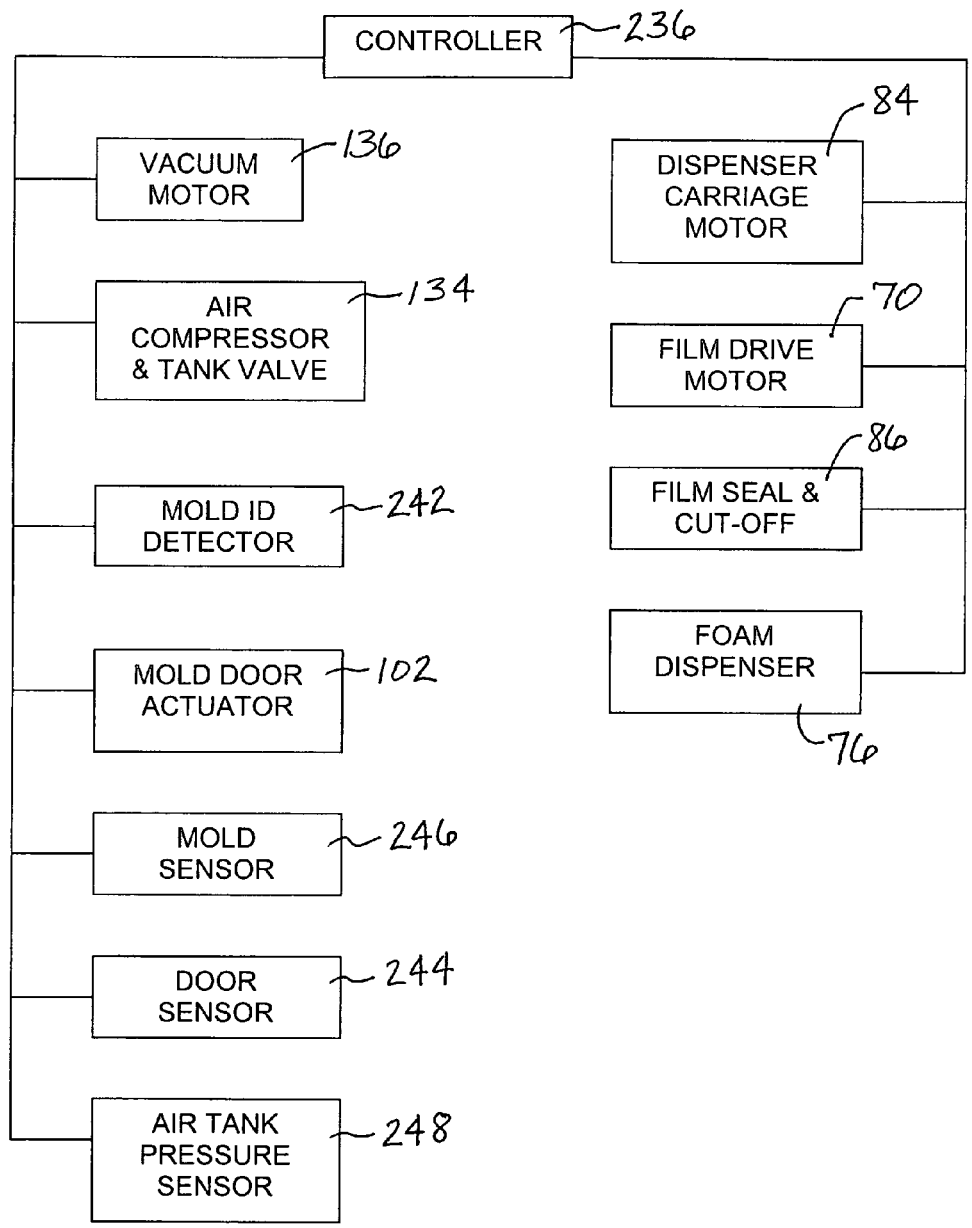
FIG. 19 is a diagrammatic illustration of the system in accordance with one embodiment of the invention.

With reference to FIG. 19, the system 40 includes a controller 236 for controlling the operation of the various components of the system. The controller can be installed in an enclosure 240 mounted atop the frame 44 (FIG. 2). The controller is connected to the motor 84 for traversing the carriage that carries the dispenser 76 of the cushion-making apparatus, and is connected to the dispenser 76 for controlling its on/off functionality and optionally the foam flow rate. The controller is also connected to the drive motor 70 for driving the drive roller that advances the film through the cushion-making apparatus, and to the film sealing and cut-off device 86 for sealing the film plies along a transverse line and severing a completed cushion from the rest of the film material. The controller is further connected to the vacuum motor 136 of the vacuum/blowout system, and to the air compressor 134 and its associated valve that is operable to allow compressed air to charge the air tank. The controller is also connected to the mold door actuator 102.

The controller can be connected to various sensors and detectors for sensing conditions associated with the various components. As previously described in connection with FIG. 1, the system 40 can employ a mold 90 that is releasably mounted in the frame 44 so that molds can be changed easily. In one embodiment, when a mold is selected and installed in the frame, a method of identification can be employed to recognize the particular mold and adjust the machine settings automatically. The method of recognition can be with a mold identifier 241 (FIG. 4) such as a bar code, RFID tag, or other similar mold identifier device. In this manner operating parameters such as the film length for a given cushion, amount of foam to be dispensed for the cushion, the foam dispersion pattern to be used, the cycle time (i.e., how long the mold is to be kept closed to allow the cushion to expand fully), and others can be predetermined at the time that a mold is manufactured. Therefore, when a mold is installed or replaced, the system can automatically recognize the particular mold and set the operating parameters, eliminating the need for an operator to re-program the system. In this regard, as represented in FIG. 19, the controller 236 can be connected with a mold identification detector 242 (e.g., a hand-held reader, or a detector mounted in the frame of the system, for reading a bar code, RFID tag, or the like) that detects the mold identifier and enables the controller to select a set of predetermined values for the operating parameters. The set of predetermined values associated with the mold type indicated by the mold identifier can be programmed in the controller's memory or can be stored in the mold identifier itself and communicated to the controller via the mold identification detector 242. When the controller stores the predetermined values, the controller's memory can store multiple sets of values for multiple mold types.

The actuator 102 controlling the door can have limit switches 244 or other types of sensors to insure that the door is in the correct position. If the actuator 102 comprises an air cylinder, magnetic Hall effect switches are suitable. The controller 236 is connected with the door sensor or limit switch 244 and is operable to wait until the door sensor indicates the door is fully open (FIG. 18) before starting a molding cycle, and to ensure that the door has closed completely (FIG. 16) when the cushion is expanding.

A sensor 246 can be employed to insure that the cushion has been fully ejected from the mold prior to beginning another cycle. There are many ways that this can be accomplished. The sensor can comprise a photo eye or ultrasonic sensor installed into the mold to inspect the cavity. More preferably, the sensor is attached to the frame 44 (FIG. 1) rather than the mold so that the mold can be removed and replaced without the need to detach and reattach sensors or sensor leads. One drawback with the frame-mounted sensor is that it can be difficult to look inside the cavity since each mold can be different and the sensor may need to be adjusted for each mold. In this case, a sensor can be used that is mounted in a manner to scan just forward of the opening of the mold, i.e., looking vertically across the front open side of the mold. This could comprise an ultrasonic sensor or a laser sensor that can detect the motion of the cushion as it is ejected. When the door opens, the sensor will see the space in front of the mold. When the blowout occurs, the sensor must first see the cushion as it passes by, then see that the cushion is no longer there to ensure that the cushion has been ejected. In this way, the system will never attempt to make a cushion if one is stuck in the mold.

When the blowout system is actuated, a solenoid or the like is energized to couple the air compressor 134 to the air tank 132 long enough to charge the tank and open the magnetic shuttle valve 160, and then the solenoid must shut off. This can be done simply by turning the solenoid on for a particular period of time, since the tank charging time is generally consistent; however a more reliable way is to monitor the blowout and ensure its occurrence. A preferred method is to use a pressure transducer or pressure switch 248 (FIG. 19) connected with the controller 236 to monitor the pressure inside the tank. During a blowout cycle, the pressure inside the tank will rise, then drop rapidly when blowout occurs, as previously described in connection with FIG. 14. The controller is able to recognize that blowout has occurred based on the output from the pressure sensor 248. When the controller sees a pressure rise followed by a rapid pressure drop, it can de-energize the solenoid until it is time to start another cycle.

In use, the system 40 and method of the invention in accordance with one embodiment entail the following operations:

The controller instructs the cushion-making apparatus 60 to produce a cushion of a particular length and foam distribution as described in the aforementioned co-pending '708 application.

Once the less than fully expanded cushion has reached a length that places it in front of the open mold 90, the vacuum motor 136 is energized, pulling the cushion into the mold as previously described, and a solenoid controlling the pneumatic cylinder 102 is energized to cause the cylinder to close the mold door 100, trapping the expanding cushion inside the mold. The vacuum motor is de-energized.

The cushion-making apparatus 60 is then instructed to perform its cut-off sequence. In this manner, the cushion is secured in the mold before it is severed from the continuous film material.

The expanding cushion is held in the mold for a period of time so that it can expand to fill the mold and become firm. This can take from 20 seconds to about one minute depending upon the type of foam used and the size and shape of the cushion.

The cylinder 102 is actuated to cause the door 100 to be opened and a solenoid is energized to cause the compressor 134 to charge the air tank 132 and perform the blowout operation as previously described.

The sequence then restarts.

The system 40 can be operated in a "manual" mode in which the operator requests one, two, or some other predetermined number of cushions to be made, after which the system will automatically stop. Alternatively, the system can be run in a fully automatic mode in which cushions are continuously made and ejected onto a conveyor or other device, until such time as the system is stopped by the operator or otherwise.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A molding system for molding foam-in-bag cushions each formed by dispensing a foam-forming composition into a bag of flexible film material, the molding system comprising:

a mold defining a mold cavity configured for receiving a cushion placed in the mold cavity and allowed to expand to substantially fill the mold cavity, an air plenum separate from the mold cavity, a plurality of air passages that connect the mold cavity to the air plenum, and at least one port connected to the air plenum, the mold cavity having an open side to permit a cushion to enter the mold cavity and subsequently to exit the mold cavity after expansion of the cushion, the mold further comprising a door that is movable between a closed position closing the open side of the mold cavity and an open position allowing a cushion to enter and exit through the open side; and a pneumatic vacuum/blowout system connected with the at least one port, the vacuum/blowout system comprising a vacuum source, an air tank containing pressurized air, an air compressor coupled with the air tank for pressurizing the air tank, and a vacuum/blowout valve structured and arranged to alternately couple the at least one port either to the vacuum source such that air is evacuated from the mold cavity via the air passages and air plenum so as to suck a newly formed cushion into the mold cavity whereupon the door is closed and the cushion is allowed to expand to substantially fill the mold cavity, or to the air tank such that pressurized air is supplied from the air tank to the mold cavity via the air plenum and air passages to expel an expanded cushion from the mold cavity after the door is opened, wherein the vacuum/blowout valve is operable to open in response to pressure in the air tank reaching a predetermined value so as to couple the air tank to the at least one port of the mold.

2. The molding system of claim 1, further comprising a pneumatic cylinder connected with the door for opening and closing the door, the pneumatic cylinder being coupled with the air compressor via a controllable valve system.

3. The molding system of claim 1, wherein the vacuum/blowout system comprises an air chamber connected to the at least one port and having a first passage connected to the air tank and a second passage connected to the vacuum source, and wherein the vacuum/blowout valve comprises a shuttle valve having a valve member that shuffles between a vacuum position closing the first passage and opening the second passage such that the at least one port is coupled to the vacuum source, and a blowout position opening the first passage and closing the second passage such that the at least one port is coupled to the air tank.

4. The molding system of claim 3, wherein the shuttle valve comprises a magnetic shuttle valve.

5. The molding system of claim 4, wherein a magnet is arranged for exerting a magnetic attraction force on the valve member urging the valve member toward the vacuum position, and wherein the valve member is arranged such that air pressure within the air tank acts on the valve member to urge the valve member toward the blowout position, such that when sufficient pressure builds up in the air tank the air pressure overcomes the magnetic attraction force to move the valve member to the blowout position.

6. The molding system of claim 5, wherein the valve member is movable in a shuttle guide between the vacuum and blowout positions, the magnet is affixed to the shuttle guide, and at least a portion of the valve member is a magnetically permeable material attracted by the magnet.

7. The molding system of claim 5, wherein the air tank includes a valve cap that comprises the magnetic shuttle valve and defines at least part of the air chamber.

8. The molding system of claim 7, wherein the vacuum source comprises a vacuum motor coupled with the valve cap.

9. The molding system of claim 7, wherein the valve member of the shuttle valve includes a tubular portion, and wherein the valve cap defines a guide passage connected to the second passage in the air chamber, the guide passage receiving the tubular portion of the valve member at least in the blowout position.

10. The molding system of claim 9, wherein the tubular portion of the valve member has one or more apertures through a side wall of the tubular portion into an interior thereof, the valve member in the blowout position being disposed in the guide passage so as to substantially isolate the one or more apertures from the air chamber, and the valve member in the vacuum position being withdrawn sufficiently from the guide passage to expose the one or more apertures to the air chamber so as to conduct air from the air chamber through the one or more apertures into the guide passage.

11. The molding system of claim 1, further comprising a latch mechanism for latching the door in the closed position.

12. The molding system of claim 11, wherein the door is connected to the mold so as to pivot relative to the mold about a pivot axis remotely spaced from the open side of the mold cavity such that in the open position the door is remotely spaced from the open side of the mold cavity.

13. The molding system of claim 11, wherein the latch mechanism is movable between latched and unlatched positions.

14. The molding system of claim 13, further comprising a controllable actuator for moving the latch mechanism between latched and unlatched positions and moving the door between the closed and open positions.

15. The molding system of claim 14, wherein the actuator for the latch mechanism and door comprises a pneumatic cylinder.

16. The molding system of claim 13, wherein the latch mechanism comprises a latch mounted on the door adjacent one edge thereof such that the latch is pivotable relative to the door, and a catch affixed to the mold for being engaged by the latch in the latched position of the latch mechanism, the latch mechanism further comprising a lever having one end connected to the latch and an opposite end connected to the actuator, the lever being moved by the actuator to pivot the latch to the unlatched position disengaged from the catch and to open the door.

17. The molding system of claim 16, wherein the latch is pivotally connected to the lever and is biased by a spring to pivot in a first direction toward a latching position of the latch relative to the lever, and the catch is arranged such that as the door is moved to the closed position thereof, the catch urges the latch to pivot in a second direction, opposite to the first direction, out of the latching position until the latch clears the catch and then the spring urges the latch to pivot in the first direction back to the latching position to engage the catch and prevent the door from opening.

18. The molding system of claim 17, wherein the latch mechanism is configured such that the latch at all times is prevented from pivoting in the first direction past the latching position, and such that when the actuator begins to move the lever to open the door, the lever and latch pivot as a unit to disengage the latch from the catch before the door begins to open.

19. The molding system of claim 1, further comprising a frame supporting the mold and the pneumatic vacuum/blowout system.

20. The molding system of claim 19, further comprising a cushion-making apparatus supported on the frame and arranged to supply a cushion to the mold.

21. The molding system of claim 19, wherein the mold is releasably attached to the frame.

22. A molding system for molding foam-in-bag cushions each formed by dispensing a foam-forming composition into a bag of flexible film material, the molding system comprising:

a mold defining a mold cavity configured for receiving an expanding foam-in-bag cushion placed in the mold cavity, the mold cavity having a length and a width, the mold further defining an air plenum separated from the mold cavity by a bottom wall of the mold cavity, the air plenum extending the length and width of the mold cavity, a plurality of air passages connecting the mold cavity to the air plenum, the air passages collectively having a total flow area and being spaced apart along the bottom wall of the mold cavity, and the mold further defining at least one port connected to the air plenum, the mold cavity having an open side opposite the bottom wall to permit a cushion to enter the mold cavity and subsequently to exit the mold cavity after expansion of the cushion, the mold further comprising a door that is movable between a closed position closing the open side of the mold cavity and an open position allowing a cushion to enter and exit through the open side; and a pneumatic vacuum/blowout system connected with the at least one port, the vacuum/blowout system comprising a vacuum source, an air tank containing pressurized air, and a vacuum/blowout valve structured and arranged to alternately couple the at least one port either to the vacuum source such that air is evacuated from the mold cavity via the air passages and air plenum so as to suck a newly formed cushion into the mold cavity whereupon the door is closed and the cushion is allowed to expand to substantially fill the mold cavity, or to the air tank such that pressurized air is supplied from the air tank to the air plenum via a flowpath, such that the pressurized air flows through the air passages into the mold cavity so as to expel an expanded cushion from the mold cavity after the door is opened;

wherein the flowpath between the air tank and the air plenum is configured such that no portion of the flowpath is smaller than a predetermined value in flow area, and the total flow area of the air passages is also at least said predetermined value.

* * * * *

UNITED STATES PATENT AND TRADEMARK OFFICE
CERTIFICATE OF CORRECTION

| | | |
|---|---|---|
| PATENT NO. | : 7,641,459 B2 | Page 1 of 1 |
| APPLICATION NO. | : 11/414972 | |
| DATED | : January 5, 2010 | |
| INVENTOR(S) | : Sperry et al. | |

It is certified that error appears in the above-identified patent and that said Letters Patent is hereby corrected as shown below:

Column 15,

Line 31, "that shuffles between" should read --that shuttles between--.

Signed and Sealed this

Fourteenth Day of June, 2011

David J. Kappos
*Director of the United States Patent and Trademark Office*